(12) United States Patent  
Morris

(10) Patent No.: US 8,661,361 B2
(45) Date of Patent: Feb. 25, 2014

(54) METHODS, SYSTEMS, AND COMPUTER PROGRAM PRODUCTS FOR NAVIGATING BETWEEN VISUAL COMPONENTS

(75) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 487 days.

(21) Appl. No.: 12/868,767

(22) Filed: Aug. 26, 2010

(65) Prior Publication Data
US 2012/0054648 A1 Mar. 1, 2012

(51) Int. Cl.
*G06F 3/048* (2013.01)

(52) U.S. Cl.
USPC ............ 715/767; 715/783; 715/802; 715/803

(58) Field of Classification Search
USPC .................................. 715/767, 783, 802, 803
See application file for complete search history.

(56) References Cited

U.S. PATENT DOCUMENTS

| | | |
|---|---|---|
| 4,839,853 A | 6/1989 | Deerwester |
| 5,029,013 A | 7/1991 | Hiratsuka et al. |
| 5,159,334 A | 10/1992 | Baumert et al. |
| 5,297,039 A | 3/1994 | Kanaegami et al. |
| 5,540,597 A | 7/1996 | Budman et al. |
| 5,642,518 A | 6/1997 | Kiyama et al. |
| 5,671,295 A | 9/1997 | Miyake |
| 5,696,962 A | 12/1997 | Kupiec |
| 5,737,560 A | 4/1998 | Yohanan |
| 5,778,256 A | 7/1998 | Darbee |
| 5,794,233 A | 8/1998 | Rubinstein |
| 5,819,261 A | 10/1998 | Takahashi et al. |
| 5,877,765 A | 3/1999 | Dickman et al. |
| 5,877,767 A | 3/1999 | Yohanan |
| 5,895,465 A | 4/1999 | Guha |
| 5,913,215 A | 6/1999 | Rubinstein et al. |
| 5,917,491 A | 6/1999 | Bauersfeld |
| 5,918,237 A | 6/1999 | Montalbano |
| 5,950,214 A | 9/1999 | Rivette et al. |
| 5,974,409 A | 10/1999 | Sanu et al. |
| 5,978,817 A | 11/1999 | Giannandrea et al. |
| 5,991,751 A | 11/1999 | Rivette et al. |

(Continued)

FOREIGN PATENT DOCUMENTS

| | | |
|---|---|---|
| EP | 1030247 | 8/2000 |
| GB | 2339374 | 1/2000 |

(Continued)

OTHER PUBLICATIONS www.open-ideas.org—Open Ideas, retrieved Apr. 6, 2001.

(Continued)

*Primary Examiner* — Omar Abdul-Ali
(74) *Attorney, Agent, or Firm* — Patrick E. Caldwell, Esq.; The Caldwell Firm, LLC

(57) ABSTRACT

Methods and systems are described for navigating between visual components. A first visual component, of a first operating application in a plurality of operating applications, is detected in a first application region of a presentation space of a display device. A first navigation control is presented, in a first navigation region determined based on the first application region, for navigating to a second visual component, of a second application in the plurality, in a second application region in the presentation space. A user input corresponding to the first navigation control is detected. In response to the detected user input, navigation information is sent to navigate to the second visual component.

273 Claims, 13 Drawing Sheets

(56) References Cited

U.S. PATENT DOCUMENTS

| | | | |
|---|---|---|---|
| 5,991,780 A | 11/1999 | Rivette et al. | |
| 5,999,907 A | 12/1999 | Donner | |
| 6,012,093 A | 1/2000 | Maddalozzo, Jr. et al. | |
| 6,014,663 A | 1/2000 | Rivette et al. | |
| 6,018,714 A | 1/2000 | Risen, Jr. et al. | |
| 6,018,749 A | 1/2000 | Rivette et al. | |
| 6,028,602 A | 2/2000 | Weidenfeller et al. | |
| 6,037,934 A | 3/2000 | Himmel et al. | |
| 6,041,360 A | 3/2000 | Himmel et al. | |
| 6,072,491 A | 6/2000 | Yohanan | |
| 6,081,829 A | 6/2000 | Sidana | |
| 6,100,890 A | 8/2000 | Bates et al. | |
| 6,108,651 A | 8/2000 | Guha | |
| 6,154,725 A | 11/2000 | Donner | |
| 6,173,251 B1 | 1/2001 | Ito et al. | |
| 6,189,024 B1 | 2/2001 | Bauersfeld et al. | |
| 6,230,171 B1 | 5/2001 | Pacifici et al. | |
| 6,243,091 B1 | 6/2001 | Berstis | |
| 6,252,597 B1 | 6/2001 | Lokuge | |
| 6,263,314 B1 | 7/2001 | Donner | |
| 6,275,862 B1 | 8/2001 | Sharma et al. | |
| 6,314,423 B1 | 11/2001 | Himmel et al. | |
| 6,339,767 B1 | 1/2002 | Rivette et al. | |
| 6,353,827 B1 | 3/2002 | Davies et al. | |
| 6,381,651 B1 | 4/2002 | Nishio et al. | |
| 6,389,434 B1 | 5/2002 | Rivette et al. | |
| 6,434,580 B1 | 8/2002 | Takano et al. | |
| 6,437,527 B1 | 8/2002 | Rhodes et al. | |
| 6,460,058 B2 | 10/2002 | Koppolu et al. | |
| 6,473,752 B1 | 10/2002 | Fleming, III | |
| 6,478,001 B1 | 11/2002 | Burns et al. | |
| 6,493,702 B1 | 12/2002 | Adar et al. | |
| 6,546,393 B1 | 4/2003 | Khan | |
| 6,571,241 B1 | 5/2003 | Nosohara | |
| 6,571,295 B1 | 5/2003 | Sidana | |
| 6,578,078 B1 | 6/2003 | Smith et al. | |
| 6,601,173 B1 | 7/2003 | Mohler | |
| 6,667,751 B1 | 12/2003 | Wynn et al. | |
| 6,694,331 B2 | 2/2004 | Lee | |
| 6,697,838 B1 | 2/2004 | Jakobson | |
| 6,973,456 B1 | 12/2005 | Elgart | |
| 6,973,616 B1 | 12/2005 | Cottrille et al. | |
| 7,010,515 B2 | 3/2006 | Nakano | |
| 7,028,253 B1 | 4/2006 | Lieberman et al. | |
| 7,114,129 B2 * | 9/2006 | Awada et al. | 715/786 |
| 7,117,443 B1 | 10/2006 | Zilka et al. | |
| 7,194,691 B1 | 3/2007 | Zilka et al. | |
| 7,305,625 B1 | 12/2007 | Zilka et al. | |
| 7,412,661 B2 * | 8/2008 | Sellers et al. | 715/779 |
| 7,818,677 B2 | 10/2010 | Ruthfield et al. | |
| 8,010,900 B2 * | 8/2011 | Hart et al. | 715/747 |
| 8,117,225 B1 | 2/2012 | Zilka | |
| 2001/0047404 A1 | 11/2001 | Suda | |
| 2002/0007373 A1 | 1/2002 | Blair et al. | |
| 2002/0019837 A1 | 2/2002 | Balnaves | |
| 2002/0032659 A1 | 3/2002 | Waters | |
| 2002/0035499 A1 | 3/2002 | Germeraad et al. | |
| 2002/0042841 A1 | 4/2002 | Nishio et al. | |
| 2002/0059076 A1 | 5/2002 | Grainger et al. | |
| 2002/0070963 A1 | 6/2002 | Odero et al. | |
| 2002/0077835 A1 | 6/2002 | Hagelin | |
| 2002/0082778 A1 | 6/2002 | Barnett et al. | |
| 2002/0093528 A1 | 7/2002 | Grainger | |
| 2002/0111953 A1 | 8/2002 | Snyder | |
| 2002/0147742 A1 | 10/2002 | Schroeder | |
| 2002/0169743 A1 | 11/2002 | Arnold et al. | |
| 2002/0184095 A1 | 12/2002 | Scullard et al. | |
| 2002/0196272 A1 | 12/2002 | Ramos et al. | |
| 2003/0016241 A1 | 1/2003 | Burke | |
| 2003/0033295 A1 | 2/2003 | Adler et al. | |
| 2003/0036945 A1 | 2/2003 | Del Vecchio et al. | |
| 2003/0046307 A1 | 3/2003 | Rivette et al. | |
| 2003/0076352 A1 | 4/2003 | Uhlig et al. | |
| 2003/0135820 A1 | 7/2003 | Aasman | |
| 2003/0172020 A1 | 9/2003 | Davies et al. | |
| 2004/0181427 A1 | 9/2004 | Stobbs et al. | |
| 2004/0193697 A1 | 9/2004 | Grosvenor et al. | |
| 2004/0205537 A1 | 10/2004 | Graham et al. | |
| 2005/0059076 A1 | 3/2005 | Merkulov et al. | |
| 2005/0193330 A1 | 9/2005 | Peters | |
| 2006/0212795 A1 | 9/2006 | Cottrille et al. | |
| 2006/0294130 A1 | 12/2006 | Soo et al. | |
| 2008/0109753 A1 * | 5/2008 | Karstens | 715/802 |
| 2009/0063178 A1 | 3/2009 | Pousti et al. | |
| 2009/0138819 A1 * | 5/2009 | Yu | 715/802 |
| 2010/0169813 A1 * | 7/2010 | Chang | 715/767 |

FOREIGN PATENT DOCUMENTS

| | | |
|---|---|---|
| JP | 08190572 | 7/1996 |
| JP | 2002366797 | 12/2002 |
| WO | WO 97/17662 | 5/1997 |
| WO | WO 98/55945 | 12/1998 |
| WO | WO 00/11575 | 3/2000 |
| WO | WO 00/52618 | 9/2000 |
| WO | WO 00/60495 | 10/2000 |
| WO | WO 00/60496 | 10/2000 |
| WO | WO 00/75851 | 12/2000 |
| WO | WO 01/35277 | 5/2001 |
| WO | WO 01/54031 | 7/2001 |
| WO | WO 01/73657 | 10/2001 |
| WO | WO 01/84423 | 11/2001 |
| WO | WO 01/84424 | 11/2001 |
| WO | WO 01/84425 | 11/2001 |
| WO | WO 01/84426 | 11/2001 |
| WO | WO 02/05150 | 1/2002 |
| WO | WO 02/059147 | 8/2002 |
| WO | WO 02/086744 | 10/2002 |
| WO | WO 03/044718 | 5/2003 |

OTHER PUBLICATIONS

"Getting Started with PatentLab-II; a Sample Analysis Scenario Included", Wisdomain, Inc., Version 1.1, May 6, 2000.
Roberts, Bill, Solving the Value Equation, Knowledge management Magazine, Jan. 2001.
retrieved from the Internet Archive Wayback Machine Nov. 8, 2004.
retrieved from the Internet Archive Wayback Machine Nov. 22, 2004.
retrieved from the Internet Archive Wayback Machine Dec. 19, 2000.
retrieved from the Internet Archive Wayback Machine Jul. 6, 2000.
Microsoft press Computer Dictionary third Edition Microsoft Press, 1997.
Roberts, Ginger, Derwent Information Global Patent Sources, 1995.
East Search Screen Showing Copyright Date of 1999.
Dialog Pocket Guide, The Dialog Corporation, Copyright Date of 1998.
Dialog Pocket Guide, The Dialog Corporation, Copyright Date of 2001.
"Internet Explorer for Mac" screenshots http://en.wikipedia.org/wild/Internet.sub.-- Explorer. sub.--for.sub.--Mac., 2001.
Microsoft Internet Explorer Ver. 6.0.2800, Copyright 1995-2001.
Netscape Navigator v. 6.1, Released at least as early as Jun. 2001.
Internet Explorer 5.X Basics Release Date for IE 5.5 Jul. 12, 2000.
Internet Basics IE 5.5, p. 7: Release date for IE 5.5 Jul. 12, 2000.
Patricia Pantel, Dekang Lin, "A Statistical Corpus-Based Term Extractor" 2001.
Archived Webpages from Blink.com, 74 pages. (Feb. 2, 2009).
Archived Webpages from Clickmarks.com, 58 pages. (Oct. 5, 2008).
Archived Webpages from SpotOn.com, 74 pages. (Oct. 14, 2008).
Brs & West, Scientific and Technical information Center, USPTO, Jun. 1999, p. 4.
Chakrabarti, S. et al. (2000). "Using Memex to Archive and Mine Community Web Browsing Experience," Computer Networks 33:669-684.
East 1.1 Enhancements, Scientific and Technical Information Center, USPTO, Jul. 2000, pp. 5-86.

(56) References Cited

OTHER PUBLICATIONS

New Internet Explorer 5.5 Technologies Designed to Support Richer, Interactive Web Application (Jul. 12, 2000).

Pfaffenberger, B. (1995). Netscape Navigator 3.0, Surfing the Web and Exploring the Internet, AP Professional: Chestnut Hill, MA, pp. xv-xvi, 3, 5-12, 22, 76-84, 91-107, 201-209, 443.

SurfSaver.com Archived Webpages, 66 pages. (Feb. 19, 2009).

Underdahl, B. (2000). Opera Web Browser for Dummies, IDB Books Worldwide, Inc.: Foster City, CA, pp. 9-16, 28-32, 36-37, 40-42, 46-53, 67-93, 97, 152-153, 185-189.

Freedman, Alan, The Computer Desktop Encycloedia, AMACOM 1996.

\* cited by examiner

METHODS, SYSTEMS, AND COMPUTER PROGRAM PRODUCTS FOR NAVIGATING BETWEEN VISUAL COMPONENTS

BACKGROUND

Cluttered desktops on desktop, notebook, and handheld devices are common. Navigating among visual components of various applications requires locating a desired visual component in the clutter and/or interoperating with a standard user interface element such as a task bar and/or application menu of a desktop that remains in a single location and requires the same types of inputs and user movements for each application and/or visual component to be located. This may require a user to repeat a similar and/or same set of movements over and over. Further, a task bar or other standard application navigation user interface may be located in a location that is convenient for some applications but inconvenient for others for a user. This creates a lot of input overhead in cases where switching between applications is frequent. Input to bring an application into focus is essentially non-productive input, as it is not related to any of the tasks performed by the applications a user is interacting with.

Accordingly, there exists a need for methods, systems, and computer program products for navigating between visual components.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for navigating between visual components. In one aspect, the method includes detecting, in a first application region of a presentation space of a display device, a first visual component of a first operating application in a plurality of operating applications. The method further includes presenting a first navigation control, in a first navigation region determined based on the first application region, for navigating to a second visual component, of a second application in the plurality, in a second application region in the presentation space. The method still further includes detecting a user input corresponding to the first navigation control. The method additionally includes sending, in response to detecting the user input, navigation information to navigate to the second visual component.

Further, a system for navigating between visual components is described. The system includes a presentation space monitor component, an application navigator component, a navigation element handler component, and a navigation director component adapted for operation in an execution environment. The system includes the presentation space monitor component configured for detecting, in a first application region of a presentation space of a display device, a first visual component of a first operating application in a plurality of operating applications. The system further includes the application navigator component configured for presenting a first navigation control, in a first navigation region determined based on the first application region, for navigating to a second visual component, of a second application in the plurality, in a second application region in the presentation space. The system still further includes the navigation element handler component configured for detecting a user input corresponding to the first navigation control. The system additionally includes the navigation director component configured for sending, in response to detecting the user input, navigation information to navigate to the second visual component.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
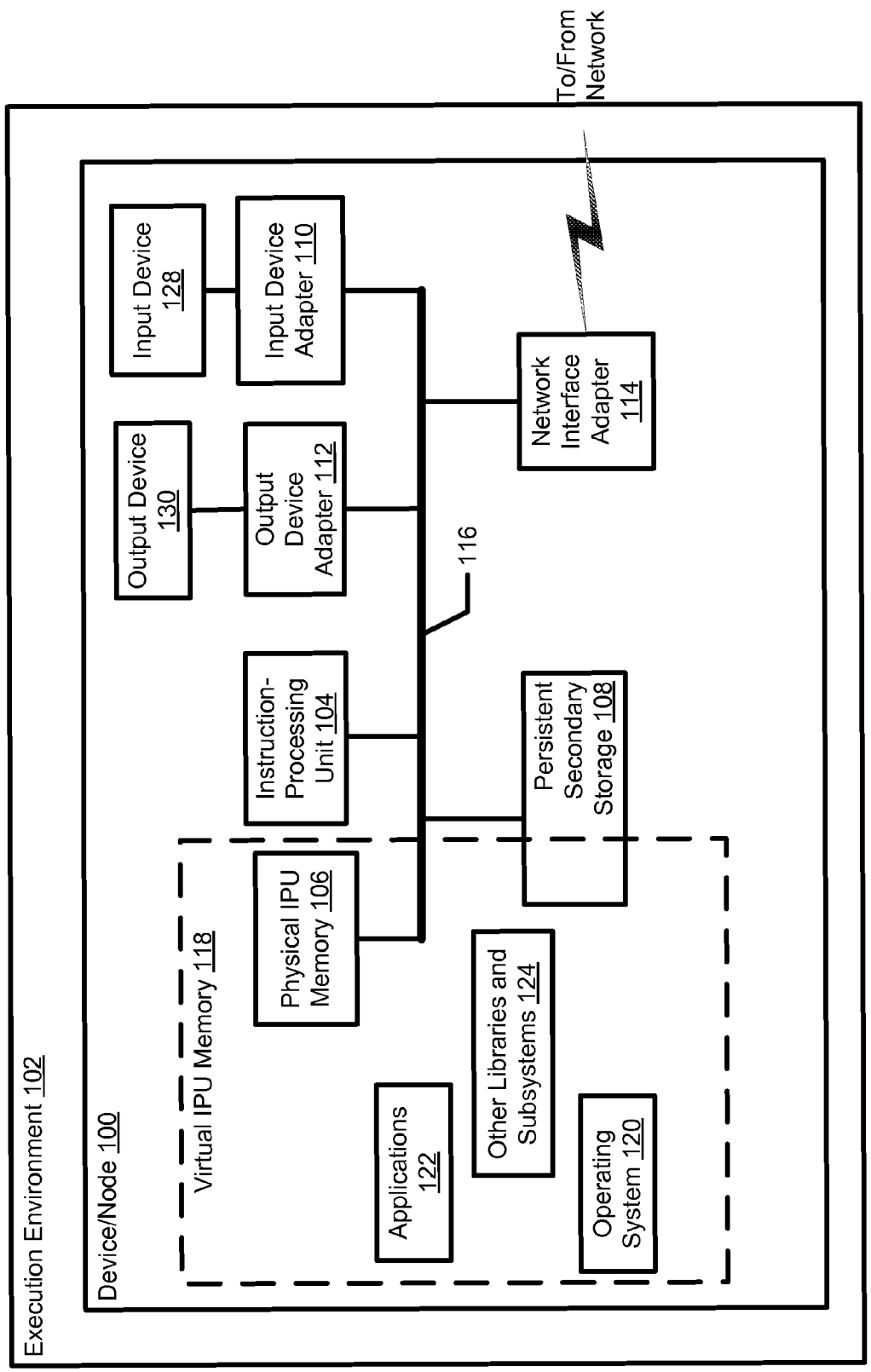
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130, in FIG. 1, exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. The terms "device" and "node" as used herein further refer to one or more devices and nodes, respectively, providing and/or otherwise included in an execution environment unless clearly indicated otherwise.

Figure 2:
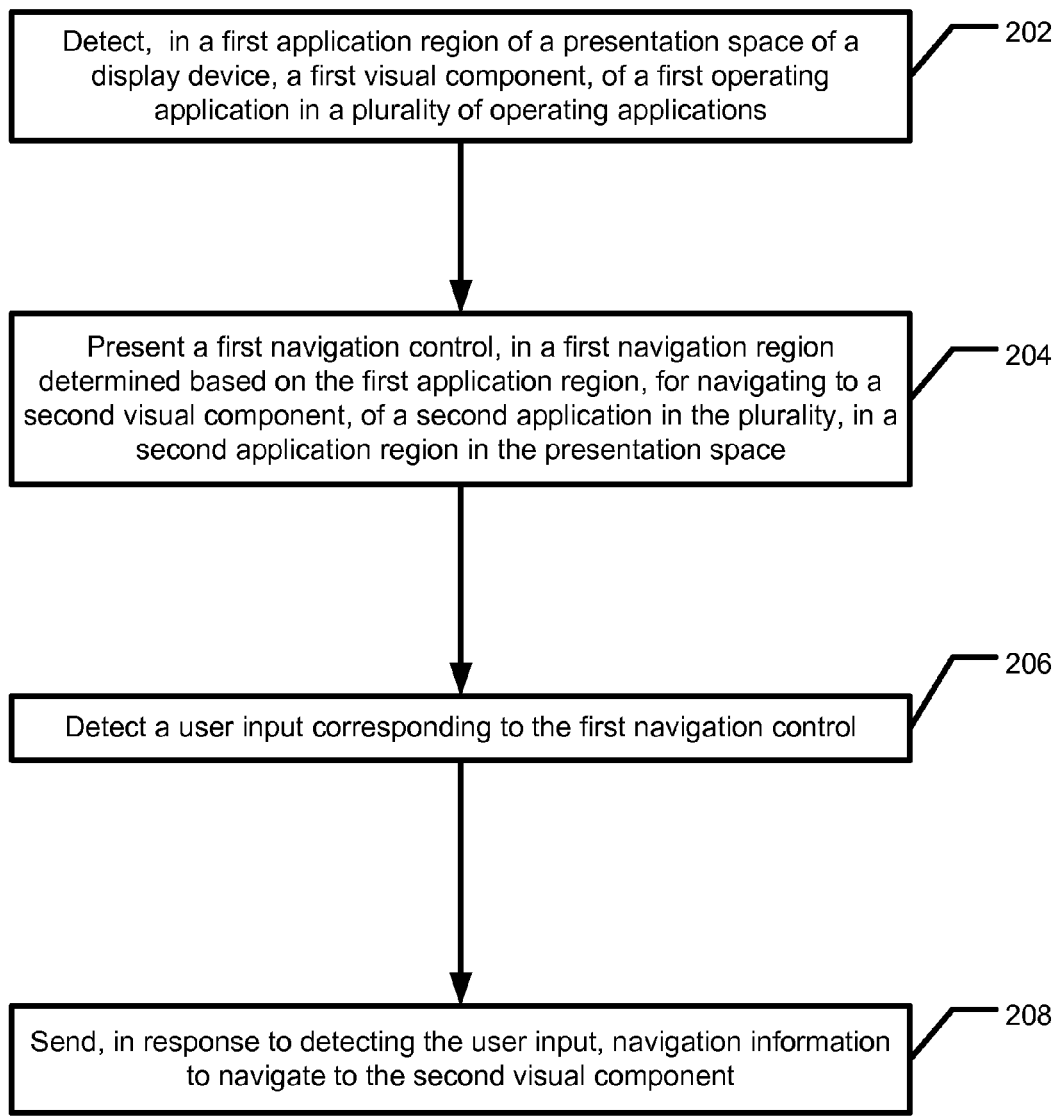
FIG. 2 is a flow diagram illustrating a method for navigating between visual components according to an aspect of the subject matter described herein.
Figure 3:
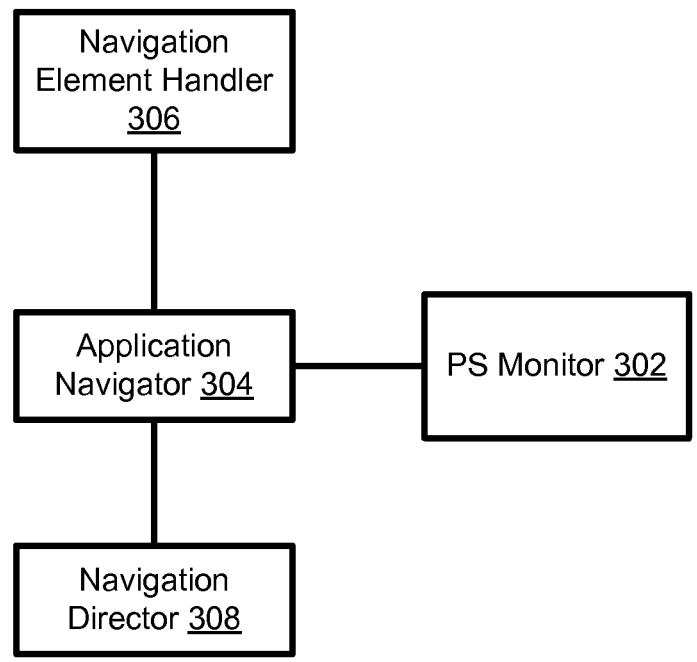
FIG. 3 is a block diagram illustrating an arrangement of components for navigating between visual components according to another aspect of the subject matter described herein.

The block diagram in FIG. 3 illustrates an exemplary system for navigating between visual components according to the method illustrated in FIG. 2. FIG. 3 illustrates a system, adapted for operation in an execution environment, such as execution environment 102 in FIG. 1, for performing the method illustrated in FIG. 2. The system illustrated includes a presentation space (PS) monitor component 302, an application navigator component 304, a navigation element handler component 306, and a navigation director component 308. The execution environment includes an instruction-processing unit, such as IPU 104, for processing an instruction in at least one of the presentation space monitor component 302, the application navigator component 304, the navigation element handler component 306, and the navigation director component 308. Some or all of the exemplary components illustrated in FIG. 3 may be adapted for performing the method illustrated in FIG. 2 in a number of execution environments. FIGS. 4*a-d* include block diagrams illustrating the components of FIG. 3 and/or analogs of the components of FIG. 3 adapted for operation in various execution environments 401 including and/or otherwise provided by one or more nodes.

FIG. 1 illustrates components of an exemplary device that may at least partially provide and/or otherwise be included in an execution environment. The components illustrated in FIGS. 4*a-d* may be included in or otherwise combined with the components of FIG. 1 to create a variety of arrangements of components according to the subject matter described herein.

Figure 4A:
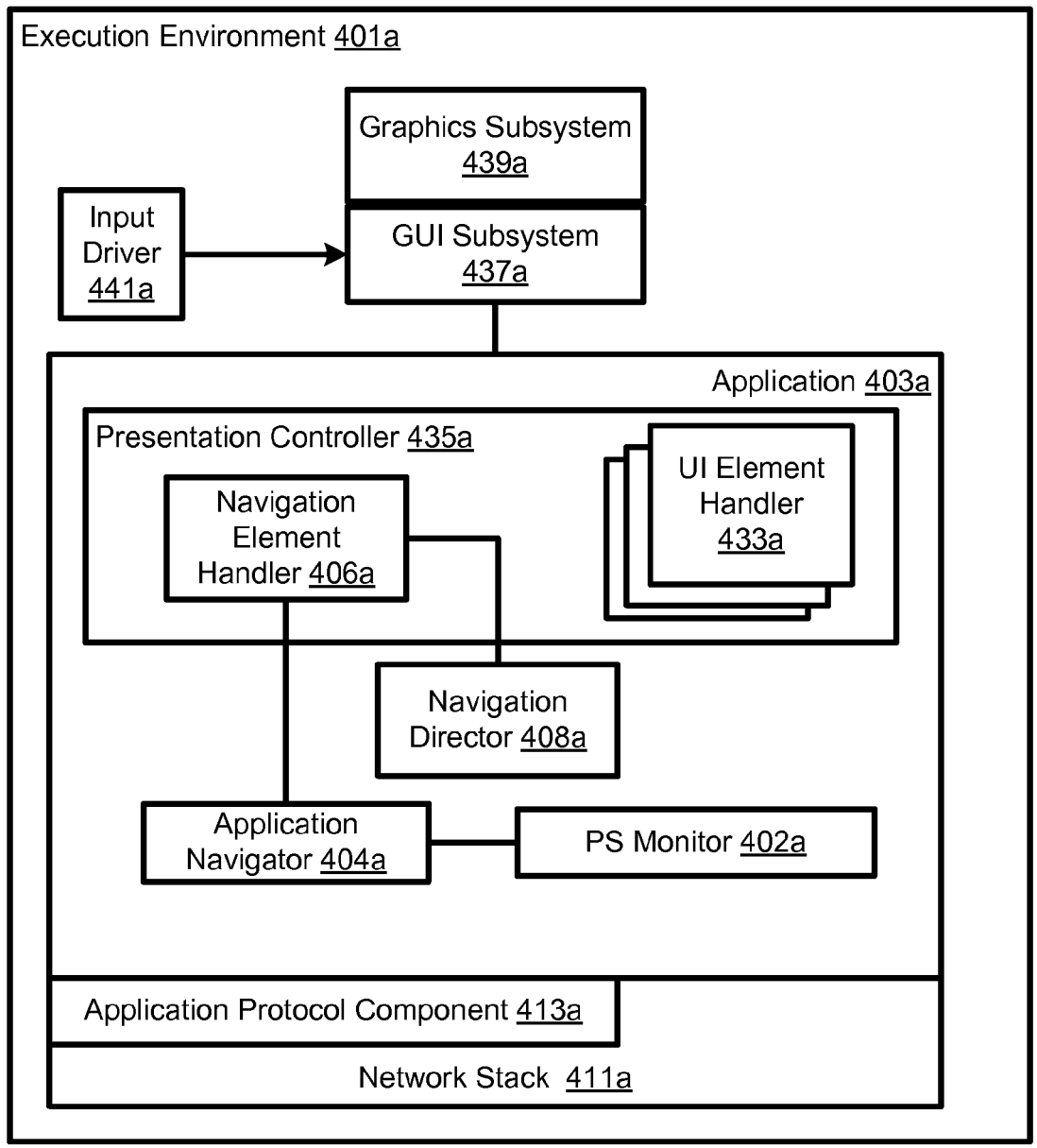
FIG. 4a is a block diagram illustrating an arrangement of components for navigating between visual components according to another aspect of the subject matter described herein.
Figure 4B:
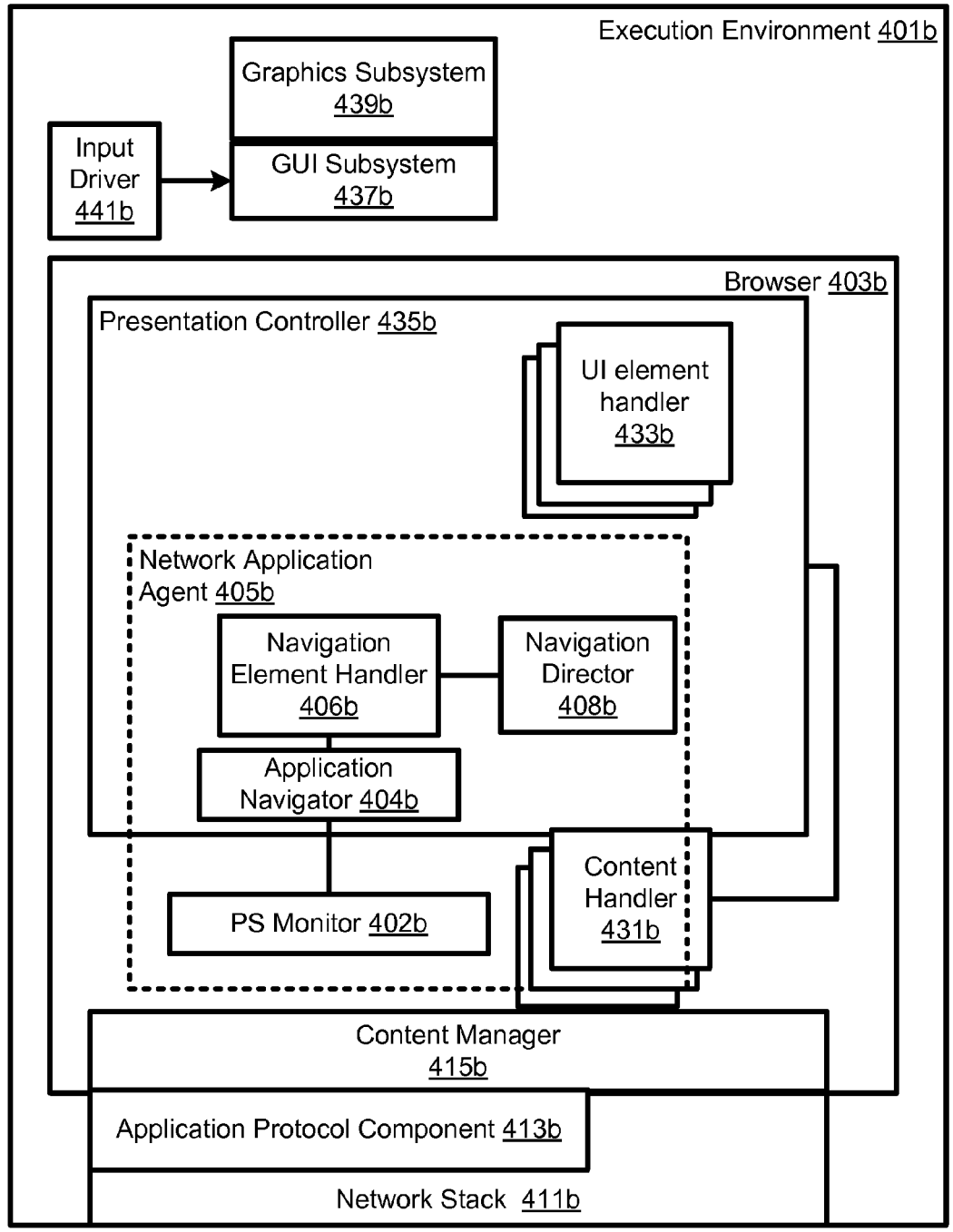
FIG. 4b is a block diagram illustrating an arrangement of components for navigating between visual components according to another aspect of the subject matter described herein.
Figure 4C:
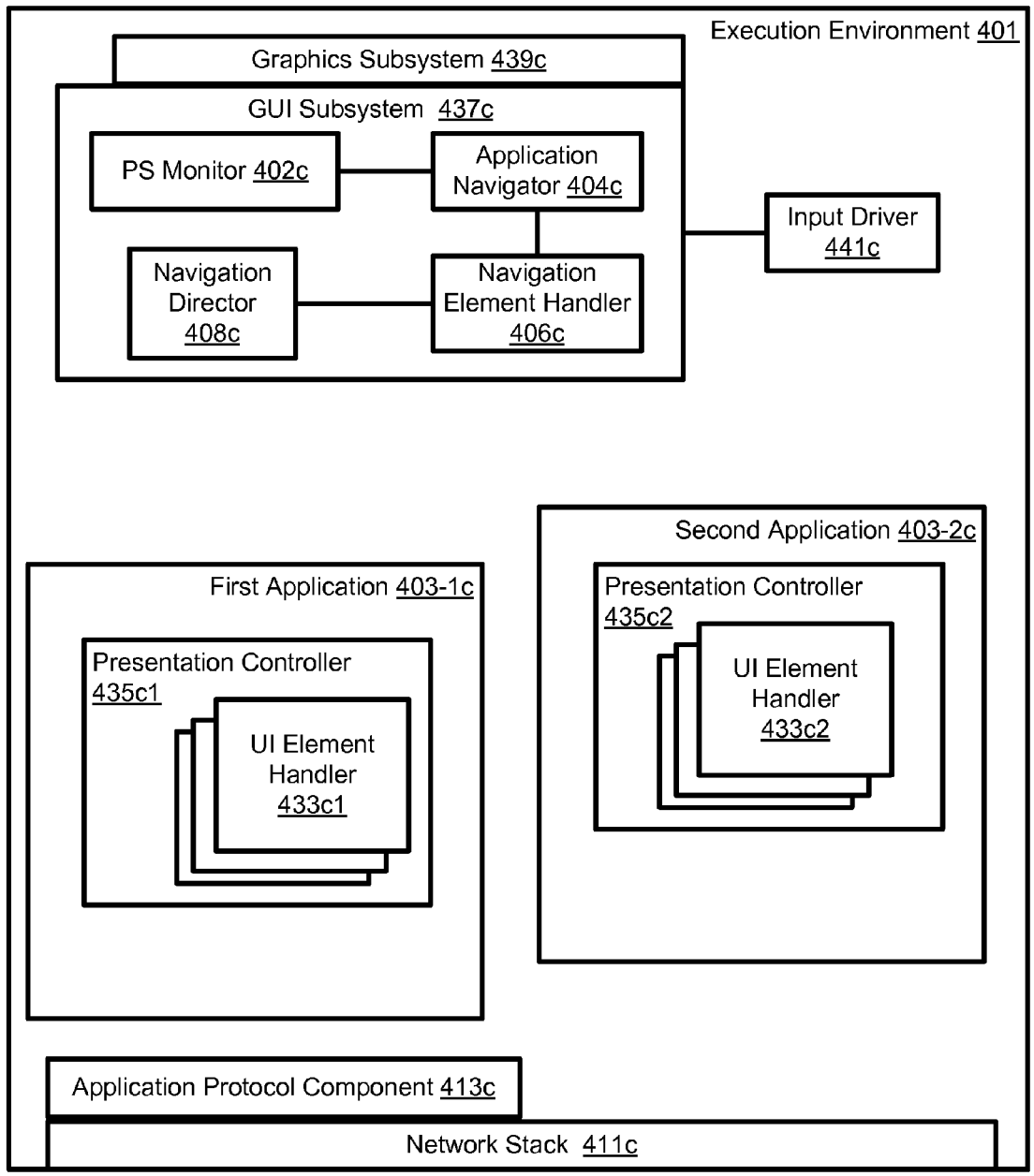
FIG. 4c is a block diagram illustrating an arrangement of components for navigating between visual components according to another aspect of the subject matter described herein.
Figure 4D:
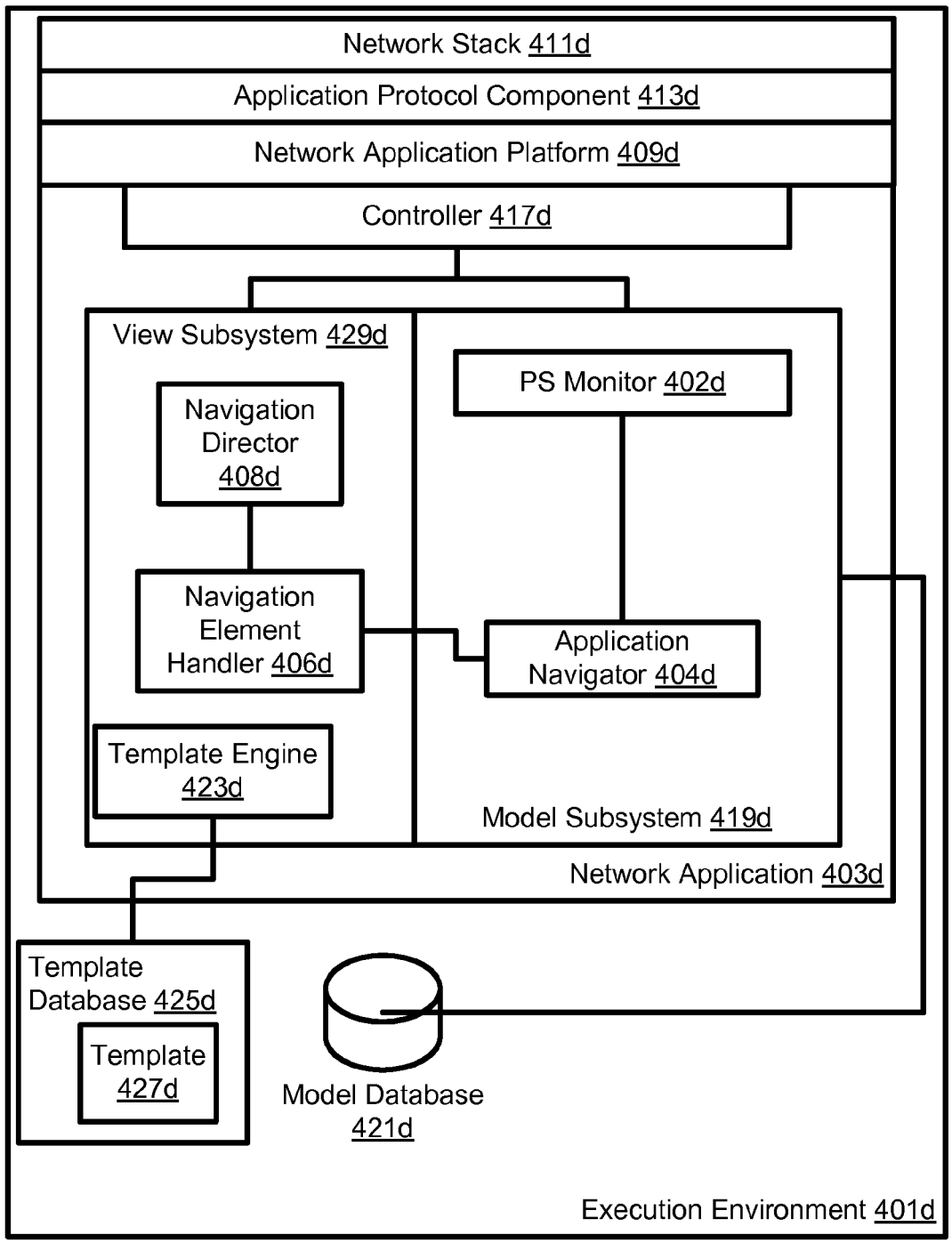
FIG. 4d is a block diagram illustrating an arrangement of components for navigating between visual components according to another aspect of the subject matter described herein.
Figure 5:
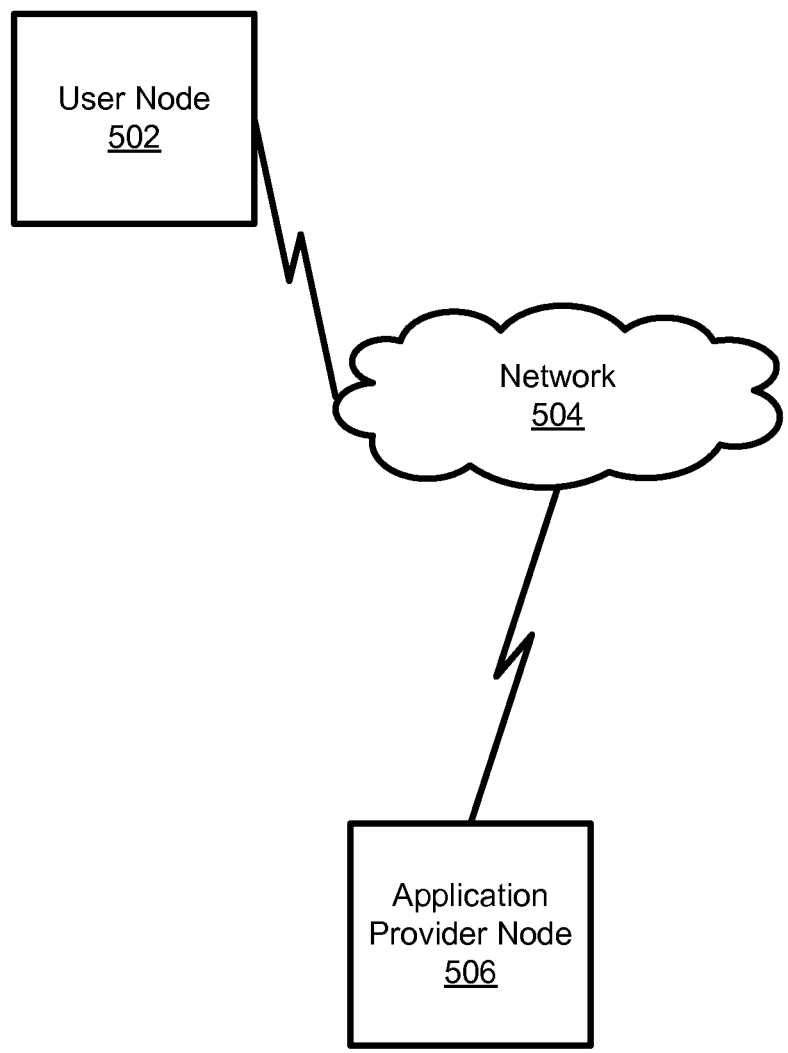
FIG. 5 is a network diagram illustrating an exemplary system for navigating between visual components according to another aspect of the subject matter described herein.

FIG. 5 illustrates user node 502 as an exemplary device that in various aspects may be included in and/or otherwise adapted for providing any of execution environments 401 illustrated in FIGS. 4*a-c*, each illustrating a different adaptation of the arrangement of components in FIG. 3. FIG. 5 illustrates that user node 502 is operatively coupled to network 504 via a network interface component, such as NIA 114. Alternatively or additionally, an adaptation of an execution environment 401 may include and/or may otherwise be provided by a device that is not operatively coupled to a network. Application provider node 506 may be included in and/or otherwise adapted for providing execution environment 401*d* illustrated in FIG. 4*d*. As illustrated in FIG. 5, application provider node 506 is operatively coupled to network 504 via a network interface component included in execution environment 401*d*.

FIG. 4*a* illustrates execution environment 401*a* hosting application 403*a* including an adaptation of the arrangement of components in FIG. 3. FIG. 4*b* illustrates execution environment 401*b* hosting browser 403*b* including an adaptation of the arrangement of components in FIG. 3 that may operate at least partially in a network application agent 405*b* received from a remote application provider, such as network application 403*d* in FIG. 4*d*. Browser 403*b* and execution environment 401*b* may provide at least part of an execution environment for network application agent 405*b* that may be received via a network from a network application operating in a remote execution environment. FIG. 4*c* illustrates an arrangement of the components in FIG. 3 adapted to operate in GUI subsystem 437*c* of execution environment 401*c*. The arrangement in FIG. 4*c* may mediate communication between applications in execution environment 401*c* and one or more output devices, such as output device 130 in FIG. 1.

FIG. 4*d* illustrates execution environment 401*d* configured to host one or more network applications, such as a Web service, illustrated by network application 403*d*. FIG. 4*d* also illustrates network application platform 409*d* that may provide services to one or more network applications. Network application 403*d* includes yet another adaptation of the arrangement of components in FIG. 3.

The various adaptations of the arrangement in FIG. 3 are not exhaustive. For example, those skilled in the art will see based on the description herein that arrangements of components for performing the method illustrated in FIG. 2 may be at least partially included in an application and at least partially external to the application. Further, arrangements for performing the method illustrated in FIG. 2 may be distributed across more than one node and/or execution environment. For example, such an arrangement may operate at least partially in browser 403b in FIG. 4b and at least partially in execution environment 401d in and/or external to network application 403d in FIG. 4d.

FIGS. 4a-d illustrate adaptations of network stacks 411 configured for sending and receiving messages over a network, such as network 504, via a network interface component. Network application platform 409d in FIG. 4d provides services to one or more network applications. In various aspects, network application platform 409d may include and/or interoperate with a web server. FIG. 4d also illustrates network application platform 409d configured for interoperating with network stack 411d directly and/or indirectly.

Network stacks 411 may support the same protocol suite, such as TCP/IP, or may communicate via a network gateway or other protocol translation device and/or service. For example, browser 403b in FIG. 4b and network application platform 409d in FIG. 4d may interoperate via their respective network stacks: network stack 411b and network stack 411d.

FIGS. 4a-d illustrate applications 403, respectively, which may communicate via one or more application layer protocols. FIGS. 4a-d respectively illustrate application protocol components 413 for communicating via one or more application layer protocols. Exemplary application protocols include hypertext transfer protocol (HTTP) and instant messaging and presence (XMPP-IM) protocol. Matching protocols enabling applications 403 to communicate via network 504 in FIG. 5 are not required, if communication is via a protocol gateway or other translator.

In FIG. 4b, browser 403b may receive some or all of network application agent 405b in one more messages sent from a network application, such as network application 403d via network application platform 409d, a network stack 411, a network interface component, and optionally an application protocol component 413. In FIG. 4b, browser 403b includes content manager component 415b. Content manager component 415b may interoperate with one or more of application protocol components 413b and/or network stack 411b to receive the message or messages including some or all of network application agent 405b.

Network application agent 405b may include a web page for presenting a user interface for network application 403d. The web page may include and/or reference data represented in one or more formats including hypertext markup language (HTML) and/or other markup language, ECMAScript and/or other scripting language, byte code, image data, audio data, and/or machine code.

In an example, in response to a request received from browser 403b in FIG. 4b operating in user node 502 in FIG. 5, controller component 417d, in FIG. 4d, operating in application provider node 506 may invoke model subsystem 419d to perform request-specific processing. Model subsystem 419d may include any number of request handlers (not shown) for dynamically generating data and/or retrieving data from model database 421d based on the request. Controller component 417d may further invoke template engine component 423d to identify one or more templates and/or static data elements for generating a user interface for representing a response to the received request. FIG. 4d illustrates template database 425d including exemplary template 427d. FIG. 4d illustrates template engine 423d as a component in view subsystem 429d configured to return responses to processed requests in a presentation format suitable for a client, such as browser 403b. View subsystem 429d may provide the presentation data to controller component 417d to send to browser 403b in response to the request received from browser 403b. Some or all of network application agent 405b may be sent to browser 403b via network application platform 409d as described above.

While the example above describes sending some or all of network application agent 405b in response to a request, network application 403d additionally or alternatively may send some or all of a network application agent to browser 403b via one or more asynchronous messages. An asynchronous message may be sent in response to a change detected by network application 403d. Publish-subscribe protocols, such as the presence protocol specified by XMPP-IM, are exemplary protocols for sending messages asynchronously.

The one or more messages including information representing some or all of network application agent 405b in FIG. 4b may be received by content manager component 415b via one or more of application protocol component(s) 413b and network stack 411b as described above. In FIG. 4b, browser 403b includes one or more content handler components 431b to process received data according to its data type, typically identified by a MIME-type identifier. Exemplary content handler components 431b include a text/html content handler component for processing HTML documents; an application/xmpp-xml content handler component for processing XMPP streams including presence tuples, instant messages, and publish-subscribe data as defined by various XMPP specifications; one or more video content handler components for processing video streams of various types; and still image data content handler components for processing various images types. Content handler components 431b process received data and may provide a representation of the processed data to one or more user interface (UI) element handler components 433b.

UI element handler components 433 are illustrated in presentation controller components 435 in FIG. 4a, FIG. 4b, and FIG. 4c. A presentation controller component 435 may manage visual, audio, and/or other types of output of its including application 403 as well as receive and route detected user and other inputs to components and extensions of its including application 403. With respect to FIG. 4b, a UI element handler component 433b in various aspects may be adapted to operate at least partially in a content handler component 431b such as a text/html content handler component and/or a script content handler component. Additionally or alternatively, a UI element handler component 433 in an execution environments 401 may operate in and/or as an extension of its including application 403, such as a plug-in providing a virtual machine for script and/or byte code, and/or may operate external to an interoperating application 403.

FIGS. 6a-e illustrate respective display presentation spaces 602 of a display in and/or operatively coupled to a device. FIGS. 6a-e illustrate first app 604-1 visual components and second app 604-2 visual components in respective presentation spaces 602. The various app 604 visual components illustrated in FIGS. 6a-e are described as user interfaces of various applications 403 and other components illustrated in FIGS. 4a-d as required in describing the subject matter herein. An app 604 visual component may be provided as a user interface of multiple applications interoperating. For example, an app 604 visual component and/or a visual component included in an app 604 visual component may be presented via interoperation of browser 403b, network application agent 405b, and network application 403d illustrated in FIG. 4b and FIG. 4d. Browser 403b may operate in user node 502 and network application 403d may operate in application provider node 506. Network application agent 405b may be provided to user node 502 by application provider node 506 via network 504, as described above.

Various UI elements of applications 403 described above may be presented by one or more UI element handler components 433 in FIGS. 4*a-c* and/or by one or more template engines 423*d* in FIG. 4*d*. In an aspect, illustrated in FIGS. 4*a-c*, UI element handler component(s) 433 of one or more applications 403 is/are configured to send presentation information representing a visual interface element, such as an operation bar 606 in FIG. 6*a* and in FIG. 6*d*, to a GUI subsystem 437. A GUI subsystem 437 may instruct a graphics subsystem 439 to draw the visual interface element in a region of a respective display presentation space 602, based on presentation information received from a corresponding UI element handler component 433.

Input may be received corresponding to a UI element via an input driver 441 illustrated in FIGS. 4*a-c*, in various adaptations. For example, a user may move a mouse to move a pointer presented in a display presentation space 602 over an operation user interface element presented in an operation bar 606. A user may provide an input detected by the mouse. The detected input may be received by a GUI subsystem 437 via an input driver 441 as an operation or command indicator based on the association of the shared location of the pointer and the operation user interface element in display presentation space 602.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable program component. The user-detectable representation is presented based on the sent information. The sent information is referred to herein as "presentation information". Presentation information may include data in one or more formats. Exemplary formats include image formats such as JPEG, video formats such as MP4, markup language data such as HTML and other XML-based markup, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the term "program" or "executable" refer to any data representation that may be translated into a set of machine code instructions and optionally associated program data. Thus, a program component or executable component may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program, specifiable in programming language in source code. An addressable entity is addressable in a program component translated from the source code in a compatible execution environment. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, or analogous tool.

Figure 6A:
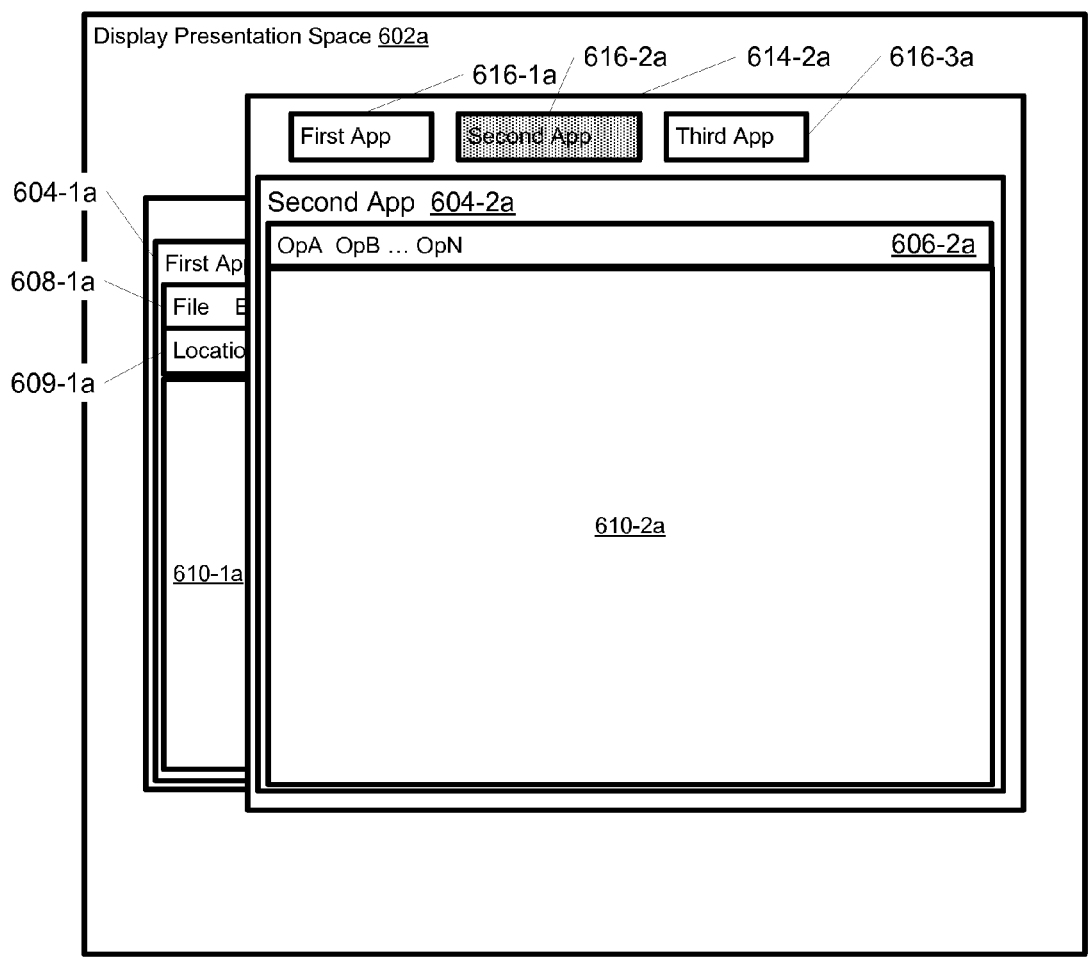
FIG. 6a is a diagram illustrating a user interface presented via a display according to another aspect of the subject matter described herein.
Figure 6B:
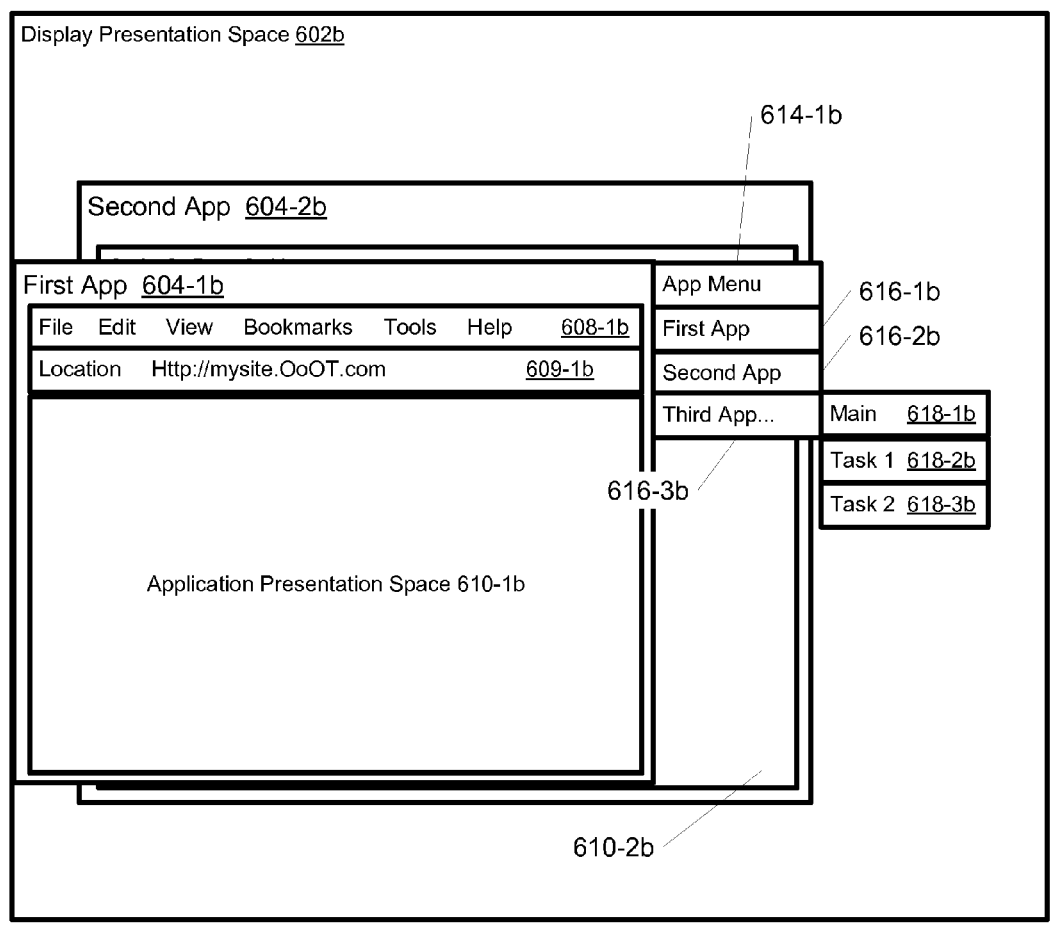
FIG. 6b is a diagram illustrating a user interface presented via a display according to another aspect of the subject matter described herein.
Figure 6C:
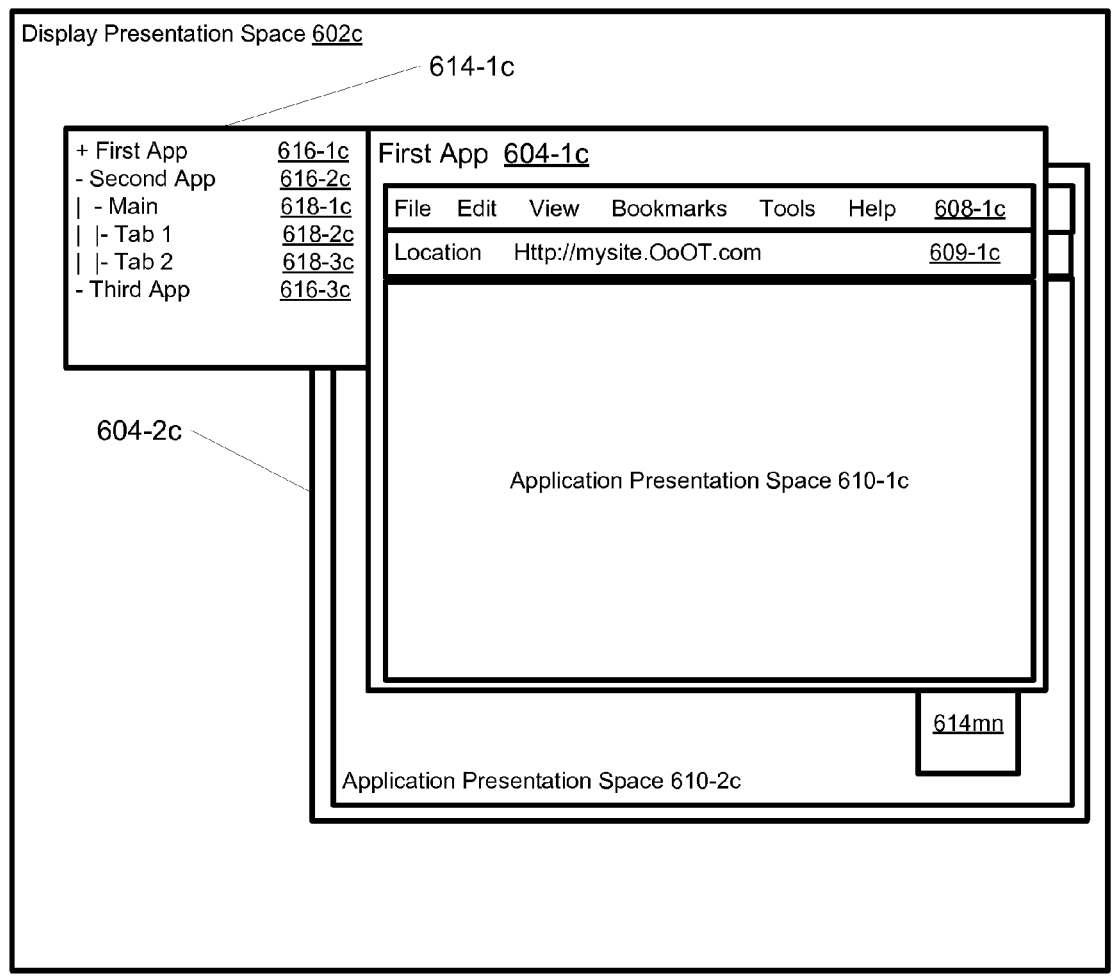
FIG. 6c is a diagram illustrating a user interface presented via a display according to another aspect of the subject matter described herein.
Figure 6D:
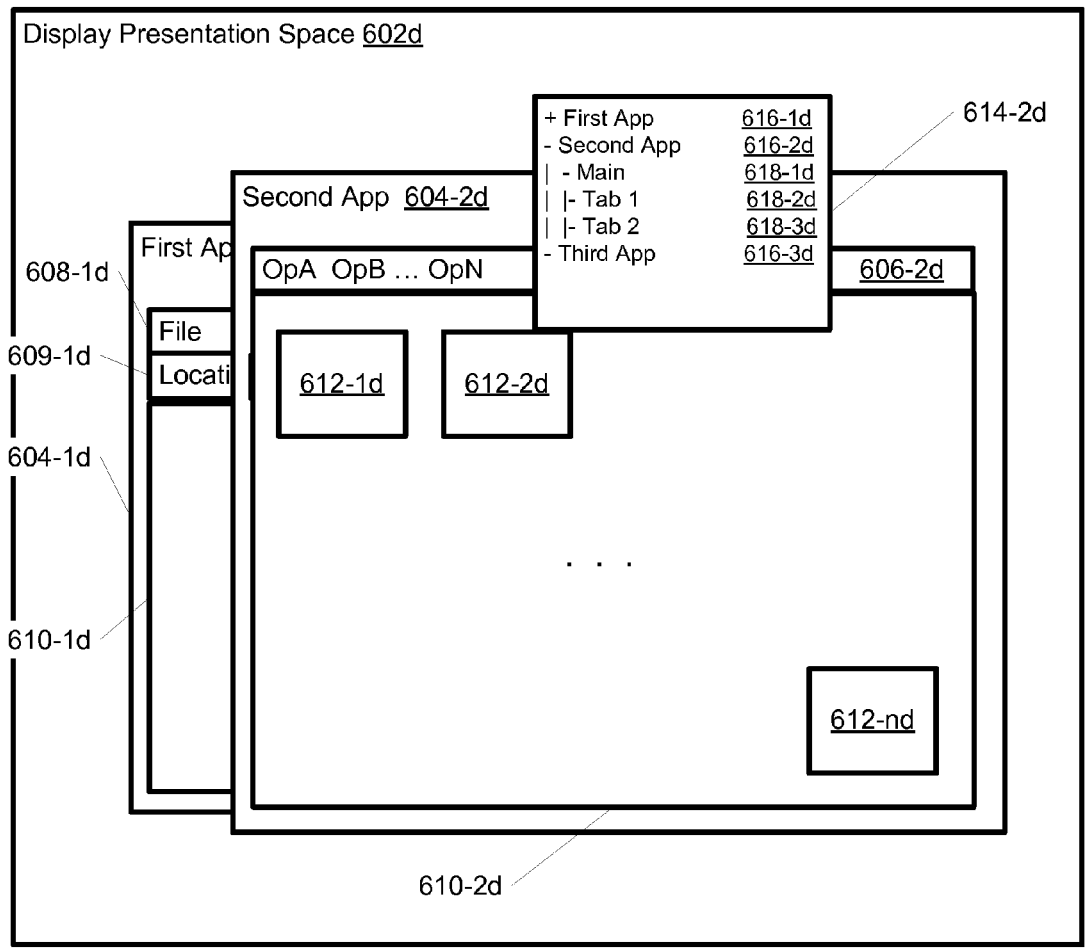
FIG. 6d is a diagram illustrating a user interface presented via a display according to another aspect of the subject matter described herein.

Returning to FIGS. 6*a-e*, first app 604-1 visual components and second app 604-2 visual components are collectively and generically are referred to as app(s) 604 visual components. App 604 visual components in FIGS. 6*a-e* illustrate a number of visual user interface elements commonly found in application user interfaces. Menu bars 608 are illustrated in first app 604-1 visual components in FIGS. 6*a-e*. Menu bars 608 are illustrated including menu controls for receiving user input to identify commands to perform. Location bars 609 are illustrated including universal resource locators (URLs) identifying sources of presented data. App 604 visual components also illustrate user interface elements providing respective application presentation spaces 610 for presenting content including other visual components illustrated by resource user interface elements 612-1*d* through 612-*nd* in FIG. 6*d* representing respective resources.

With reference to FIG. 2, block 202 illustrates that the method includes detecting, in a first application region of a presentation space of a display device, a first visual component of a first operating application in a plurality of operating applications. Accordingly, a system for navigating between visual components includes means for detecting, in a first application region of a presentation space of a display device, a first visual component of a first operating application in a plurality of operating applications. For example, as illustrated in FIG. 3, presentation space monitor component 302 is configured for detecting, in a first application region of a presentation space of a display device, a first visual component of a first operating application in a plurality of operating applications. FIGS. 4*a-d* illustrate presentation space monitor components 402 as adaptations and/or analogs of presentation space monitor component 302 in FIG. 3. One or more presentation space monitor components 402 operate in execution environments 401.

In FIG. 4*a*, PS monitor component 402*a* is illustrated as a component of application 403*a*. In FIG. 4*b*, PS monitor component 402*b* is illustrated as component of network application agent 405*b*. In FIG. 4*c*, PS monitor component 402*c* is illustrated operating external to one or more applications 403*c*. Execution environment 401*c* includes PS monitor component 402*c* in GUI subsystem 437*c*. In FIG. 4*d*, PS monitor component 402*d* is illustrated operating in network application 403*d* remote from a display device for presenting and/or updating a visual component. For example, PS monitor component 402 may operate in application provider node 506 while a visual component is presented via a display device of user node 502 based on presentation information sent via network 504 from application provider node 506.

A visual component may be detected by one or more of receiving a request to present the visual component, receiving a request for a resource for presenting the visual component, detecting a change in at least a portion of a presentation space, intercepting a communication identifying the visual component, receiving an input corresponding to the visual component, receiving a notification identifying the visual component, and sending presentation information to present at least a portion of the visual component.

In FIG. 4*a*, PS monitor 402*a* may receive a request to present a visual component, such as app 604 visual component in any of FIGS. 6*a-e*. PS monitor component 402*a* may be configured to intercept and/or otherwise mediate access to one or more UI element handler components 433*a* for presenting the app 604 visual component and/or other visual components of application 403*a*. PS monitor component 402*a* may send presentation information and/or information for generating presentation information to a UI element handler component 433*a* for presenting some or all of a visual component via a display device.

In FIG. 4*b*, PS monitor component 402*b* may receive, intercept, and/or otherwise mediate processing of a request for a resource for presenting a visual component such as a browser tab, a browser window of browser 403*b*, and/or content received from network application 403*d* in FIG. 4*d* operating in application provider node 506. Content from network application 403*d* may include network application agent 405*b* and/or content retrieved by network application agent 405*b*. PS monitor component 402*b* may be a component of browser 403*b*. Alternatively or additionally, a PS monitor component 402 may operate as a component of network application agent 405*b* and/or a component of network application 403*d* as illustrated by PS monitor component 402*d*.

PS monitor component 402*c* in FIG. 4*c* may track and/or otherwise monitor at least some changes to a presentation space accessible to GUI subsystem 437*c*. FIGS. 6*a-e* illustrate various display presentation spaces 602 and application presentation spaces 610 as exemplary presentation spaces. A change to a presentation space may include presenting a visual component via the presentation space, updating a visual component in the presentation space, and/or removing a visual component from the presentation space. A change may be in response to a user input. PS monitor component 402*c* may receive and/or otherwise monitor user input received for a visual component. In an aspect, PS monitor component 402*c* may receive change information by accessing a log maintained by GUI subsystem 437*c* and/or graphics subsystem 439*c*. The log may be accessed via receiving notifications of log entries.

As described above, a visual component may be detected by an application presenting some or all of the visual component, by a remote node, and/or by a component operating external to an application that presents some or all of the visual component.

In detecting and/or otherwise monitoring a visual component, a PS monitor component 402 may identify a region in a presentation space that includes the visual component. The region is referred to herein as an "application region". As illustrated in FIGS. 6*a-e* a visual component may be included in a plurality of visual components in a presentation space. The visual components may be included in user interfaces of a plurality of operating applications.

Returning to FIG. 2, block 204 illustrates that the method further includes presenting a first navigation control, in a first navigation region determined based on the first application region, for navigating to a second visual component, of a second application in the plurality, in a second application region in the presentation space. Accordingly, a system for navigating between visual components includes means for presenting a first navigation control, in a first navigation region determined based on the first application region, for navigating to a second visual component, of a second application in the plurality, in a second application region in the presentation space. For example, as illustrated in FIG. 3, application navigator component 304 is configured for presenting a first navigation control, in a first navigation region determined based on the first application region, for navigating to a second visual component, of a second application in the plurality, in a second application region in the presentation space. FIGS. 4*a-d* illustrate application navigator components 404 as adaptations and/or analogs of application navigator component 304 in FIG. 3. One or more application navigator components 404 operate in execution environments 401.

A navigation control is a user interface element for navigating between and/or among user interface elements of respective operating applications. The user interface elements may be visual components. A navigation control may include and/or have an application control representing a particular application. An application control may include and/or have a visual component control representing a particular visual component in the application represented by the application control. An input received corresponding to a particular application control may identify a user instruction to navigate to a visual component of the particular application. A user input corresponding to a particular visual component control may identify a user instruction to navigate to a particular visual component in a particular application corresponding to an application control that includes and/or otherwise has the visual component control.

FIGS. 6a-e illustrate various navigation control 614 visual components. Second navigation control 614-2a illustrates a user interface element that is a parent of second app 604-2a visual component. Navigation control 614-2a includes and illustrates first application control 616-1a, second application control 616-2a, and third application control 616-3a. First app 604-1a visual component may be included in a user interface for a first application, second app 604-2a visual component may be included in a user interface for a second application, and a third app visual component (not shown) may be included in a user interface for a third application.

A navigation control may be automatically presented in response to presenting of a corresponding visual component in a user interface of an operating application. For example, as described, second navigation control 614-2a includes second app 604-2a visual component of a second application. In FIG. 4c, GUI subsystem 437c may receive presentation information for presenting second app 604-2a visual component. GUI subsystem 437c may invoke application navigator component 404c. Application navigator component 404c may provide a presentation space for presenting second app 604-2a visual component in second navigation control 614-2a by instructing navigation element handler component 406c to present second navigation control 614-2a in display presentation space 602a.

In another aspect, a navigation control may be presented in response to a navigation-activate input received from a user via an input device. For example, first app 604-1b visual component in FIG. 6b may be presented by browser 403b in FIG. 4b. First navigation control 614-1b may be non-existent and/or hidden until a navigation-activate input is received by application navigator component 404b via a UI element handler component 433b. The input may be a hotkey, a touch in a designated location of a touch screen, and/or a mouse gesture defined as a navigation-activate input. Alternatively or additionally, a pointer user interface element presented within a specified distance of, for example, the top, right corner of first app 604-1b visual component may be detected as a navigation-activate input. A navigation-activate input may be defined by a particular application such as application 403a in FIG. 4a and/or browser 403b in FIG. 4b. In another aspect, a navigation-activate input may be defined for an execution environment. For example GUI subsystem 437c may include and/or otherwise access configuration information defining a navigation-activate input for applications operating in execution environment 401c. Further, a navigation-activate input may be defined and/or detected by a node remote from a node detecting the input. Application navigator component 404d and navigation element handler component 406d operating in application provider node 506 may define and/or may detect a navigation-activate input via browser 403b and/or network application agent 405b operating in user node 502.

Figure 6E:
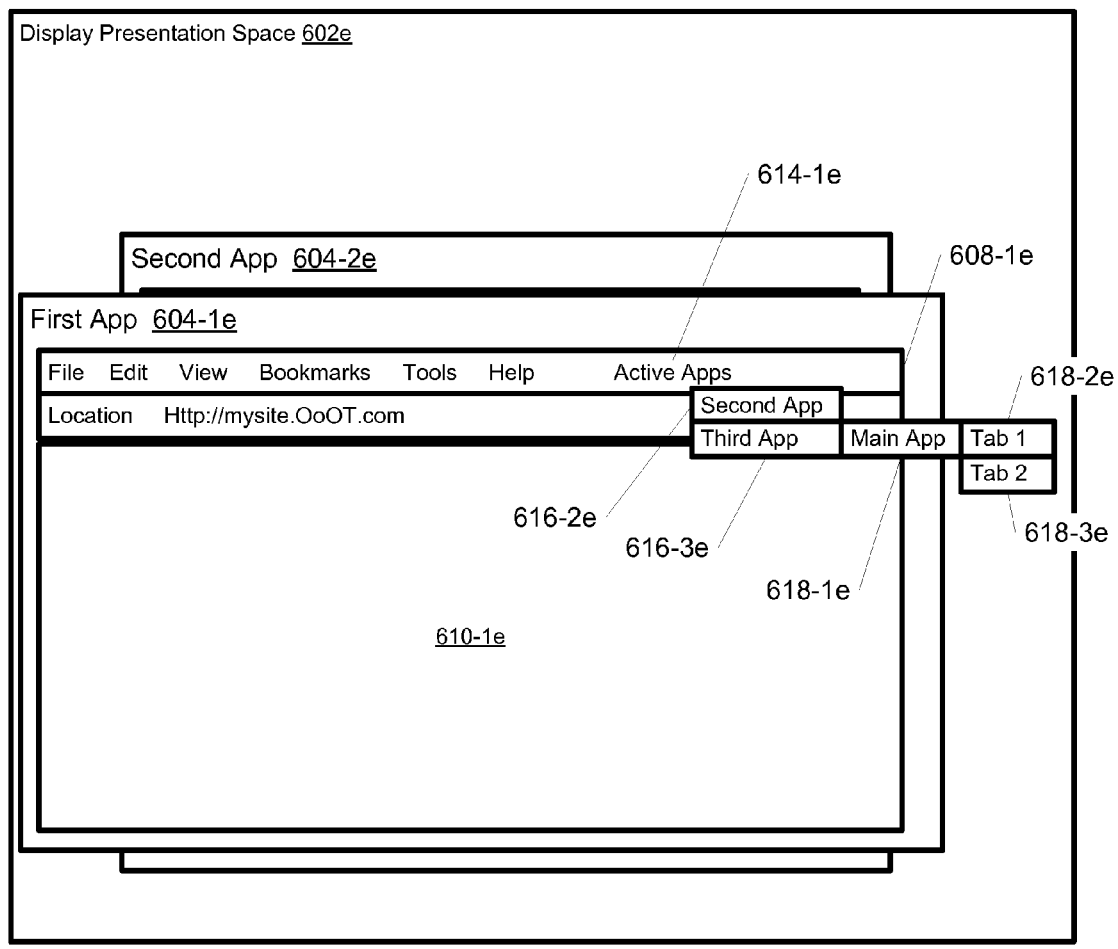
FIG. 6e is a diagram illustrating a user interface presented via a display according to another aspect of the subject matter described herein.

An application navigator component 404 may determine and/or otherwise identify a region, in a presentation space, to present a navigation control 614. The navigation region may be determined based on an application region as described above. A region including a navigation control is referred to herein as a "navigation region". As illustrated in FIGS. 6a-e, a navigation region may be determined based on an application region in various ways. FIG. 6a illustrates navigation control 614-2a in a navigation region that includes the application region of second app 604-2a visual component. FIG. 6b illustrates navigation control 614-1b in a navigation region determined based on the top, right corner of the application region for first app 604-1b visual component. FIG. 6c illustrates navigation control 614-1c in a navigation region based on a portion of a left border of the application region that includes first app 604-1c visual component. FIG. 6d illustrates navigation control 614-2d in a navigation region as a pop-up or context pane where the navigation region may be determined based on a location corresponding to an input detected in the application region including second app 604-2d visual component. FIG. 6e illustrates navigation control 614-1e in a navigation region bound to menu bar 608-1e in the application region that includes first app 604-1e visual component.

Returning to FIG. 2, block 206 illustrates that the method yet further includes detecting a user input corresponding to the first navigation control. Accordingly, a system for navigating between visual components includes means for detecting a user input corresponding to the first navigation control. For example, as illustrated in FIG. 3, navigation element handler component 306 is configured for detecting a user input corresponding to the first navigation control. FIGS. 4a-d illustrate navigation element handler component 406 as adaptations and/or analogs of navigation element handler component 306 in FIG. 3. One or more navigation element handler components 406 operate in execution environments 401.

In an aspect, an input may be detected by a navigation element handler component 406 in FIGS. 4a-d. The navigation element handler component 406 may determine a second visual component based on an ordering of applications and/or their respective visual components maintained by a corresponding application navigation component 404. For example, an ordering may be based on a z-level of visual components, a priority assigned to an application process providing a context for an operating application, a priority and/or other attribute of a thread in an application process, and/or a user-specified ordering. In an aspect, a navigation element handler component 406 and/or an application navigation component 404b may identify an application and/or a visual component of an application randomly. For example, applications and/or visual components may be assigned numbers and a random number generator may be invoked to identify an application and/or visual component identified by a number generated by the random number generator.

Detecting a user input corresponding to a navigation control may include detecting the user input corresponding to an application control included in and/or otherwise associated with the navigation control. A navigation control may include one or more application controls corresponding to one or more respective applications. In another aspect, an application control corresponding to a particular application may be included in a navigation control. A user input may be detected corresponding to a particular application control in a navigation control. The application control identifies an application. A navigation element handler component 406 may interoperate with an application navigation component 404 to identify a visual component of the application 403, such as the application's main window, a visual component most recently updated, and/or a visual component assigned input focus for an input device.

Detecting a user input corresponding to a navigation control may include detecting the user input corresponding to a visual component control included in and/or otherwise associated with the navigation control. A visual component control may be included in and/or otherwise associated with an application control corresponding to an application of a visual component corresponding to the visual component control. A navigation control and/or an application control may include one or more visual component controls corresponding to one or more respective visual components. A visual component control may be included in an application control, corresponding to a particular application, included in a navigation control. A user input may be detected corresponding to a particular visual component control in a navigation control. The visual component control identifies a particular visual component in a particular application. A navigation element handler component 406 may interoperate with an application navigation component 404 to identify the visual component of the application.

A navigation element handler component 406 may determine and/or otherwise detect an input corresponding to a navigation control 614. As illustrated in FIGS. 6a-e, a navigation control may be presented in various ways. A navigation control as illustrated in FIGS. 6a-e may include an application control 616 and/or a visual component control 618.

FIG. 6a illustrates first application control 616-1a, second application control 616-2a, and third application control 616-3a in second application control 614-2a. FIG. 6b illustrates first application control 616-1b, second application control 616-2b, and third application control 616-3b as menu items and/or submenus in navigation control 614-1b presented as a menu. FIG. 6c illustrates first application control 616-1c, second application control 616-2c, and third application control 616-3c as first level nodes in navigation control 614-1c presented as a tree view user interface control. FIG. 6c also illustrates three visual component controls 618-1c, 618-2c, 618-3c as child nodes of second application control 616-2c. FIG. 6d illustrates first application control 616-1d, second application control 616-2d, and third application control 616-3d as first level nodes in navigation control 614-2d presented as a tree view context user interface control. FIG. 6d also illustrates three visual component controls 618-1d, 618-2d, 618-3d as child nodes of second application control 616-2d. FIG. 6e illustrates no application control for first app 604-1e visual component. FIG. 6e illustrates second application control 616-2e and third application control 616-3e as menu items and/or submenus in navigation control 614-1e. FIG. 6e also illustrates three visual component controls 618-1e, 618-2e, 618-3e as a child menu items of third application control 616-3e.

An application navigation component 404 may invoke one or more navigation element handler components 406 to present and/or detect input for respective application controls and/or visual component controls.

Returning to FIG. 2, block 208 illustrates that the method yet further includes sending, in response to detecting the user input, navigation information to navigate to the second visual component. Accordingly, a system for navigating between visual components includes means for sending, in response to detecting the user input, navigation information to navigate to the second visual component. For example, as illustrated in FIG. 3, navigation director component 308 is configured for sending, in response to detecting the user input, navigation information to navigate to the second visual component. FIGS. 4a-d illustrate navigation director components 408 as adaptations and/or analogs of navigation director component 308 in FIG. 3. One or more navigation director components 408 operate in execution environments 401.

Sending the navigation information may include sending the navigation information by invoking a function, a method, and/or a subroutine. Sending the navigation information may include sending the navigation information by sending a message via a network. The message may be sent asynchronously. The message, in another aspect, may be included in a request/response exchange. Sending the navigation information may include sending the navigation information by sending data via an inter-process communication (IPC) including, for example, a message queue, a pipe, an interrupt, a semaphore, and/or a lock. Sending the navigation information may include sending the navigation information via a shared data area.

Navigation information may include information for changing an attribute of a visual component. For example, a z-order attribute, an input focus attribute, a size attribute, a location attribute, a font, a color, and/or a transparency level may be changed based on navigation information for a visual component being navigated to and/or a visual component being navigated from.

In FIG. 4a, navigation director component 408a may send navigation information to a specified message queue in execution environment 401a. Applications operating in execution environment 401a may subscribe to and/or poll the message queue to receive a navigation instruction. Navigation information may identify a visual component and/or an application to navigate to. An identified application may determine a visual component to navigate to if a visual component of the application is not identified by the navigation information.

In FIG. 6a, first app 604-1a visual component may be included in a user interface for application 403a in execution environment 401a. An input corresponding to second application control 616-2a may be detected by navigation element handler component 406a. Navigation element handler component 406a, application navigation component 404a, and/or navigation director component 408a may generate navigation information based on second application control 616-2a. Navigation director component 408a may post the navigation information to a message queue, write the navigation information to a pipe configured for exchanging navigation information between and/or among applications, and/or store the navigation information in a shared data area accessible to other applications in execution environment 401a. A second application may receive the navigation information and determine that the navigation information identifies the second application. The second application may update second app 604-2a visual component, for example, so that it is presented on top of first app 604-1a visual component as shown in FIG. 6a. The second application may determine a visual component of a user interface of second application to which to navigate. The determination may be user configurable and/or determined by execution environment 401a.

In FIG. 4b, navigation director component 408b may operate as described above. Alternatively or additionally, navigation director component 408b operating in user node 502 may send a message via network 504 to a remote node, such as application provider node 506. Network application 403d may provide a subscription service. Navigation director component 408b may send navigation information to a specified publish-subscribe tuple and/or service. Applications operating in execution environment 401a may subscribe to and/or poll the tuple and/or service to receive navigation information. Navigation information may identify a visual component and/or an application to navigate to. An identified application may determine a visual component to navigate to if a visual component of the application is not identified by the navigation information. In FIG. 6b, first app 604-1b visual component may be included in a user interface for browser 403b in execution environment 401b. An input corresponding to first visual component control 618-1b associated with third application control 616-3b as illustrated may be detected by navigation element handler component 406b. Navigation element handler component 406b, application navigation component 404b, and/or navigation director component 408b may generate navigation information based on first visual component control 618-1*b*. Navigation director component 408*b* may post the navigation information via an asynchronous message to the specified tuple and/or service. The tuple and/or service may be accessible to other applications in execution environment 401*b* via a subscription and/or via polling for navigation information.

A second application may receive the navigation information and determine that the navigation information identifies a third application. The second application may ignore the navigation information or may change an attribute of a visual component in a user interface of the second application in accordance with the instruction to navigate to the identified visual component of the third application. The third application may update a third app visual component. The third app visual component may be minimized prior to processing the navigation instruction, may be hidden behind another visual component, and/or may otherwise not be visible to a user. The third application may present the visual component identified by visual component control 618-1*b* according to the navigation instruction represented in and/or by the navigation information.

In an aspect, an input detected corresponding to a navigation control may be communicated by user node 502 to network application 403*d* operating in application provider node 506. The input information may be received by navigation element handler component 406*d*. The navigation control presented by user node 502 may be presented based on presented information provided by application navigation component 404*d* based on visual components detected by PS monitor component 402*d* interoperating with user node 502. Navigation director component 408*d* may send the navigation information to any number of requesting and/or otherwise identified client nodes, such as user node 502. In another aspect, navigation director component 408*d* may determine a node to receive the navigation information. Navigation director component 408*d* may send the navigation information to the node identified by the determination. Navigation director component 408*d* may send the navigation information in an unsolicited message via an asynchronous message and/or may send the navigation information in response to a request from the identified node.

In FIG. 4*c*, navigation director component 408*c* may send navigation information by invoking a function, method, subroutine, and/or other addressable instruction in an application identified based on the detected input corresponding to a navigation control. Applications operating in execution environment 401*c* may register an invocation point with GUI subsystem 437*c*. Registration may be explicit and/or implicit in an interoperation between an application 403*c* and GUI subsystem 437*c*. Navigation information may identify a visual component and/or an application to navigate to. An identified application may determine a visual component to navigate to if a visual component of the application is not identified by the navigation information. In FIG. 6*c*, first app 604-1*c* visual component may be included in a user interface for an application 403-1*c* in execution environment 401*c*. An input corresponding to second application control 616-2*c* may be detected by navigation element handler component 406*c*. Navigation element handler component 406*c*, application navigation component 404*c*, and/or navigation director component 408*c* may generate navigation information based on second application control 616-2*c*. Navigation director component 408*c* may invoke second application 403-2*c* providing access to the navigation information via the invocation. Second application 403-2*c* may receive the navigation information and determine a visual component to navigate to if one is not identified in the navigation information. The second application may update second app 604-2*c* visual component by moving it from behind first app 604-1*c* visual component.

In another aspect, navigation director component 408*c* may invoke first application 403-1*c*, instructing first application 403-1*c* to change a transparency level of first app 604-1*c* visual component allowing second app 604-2*c* visual component to be visible to a user. Navigation director component 408*c* may assign input focus for one or more input devices to the visual component of second application 403-2*c* so that input from the one or more input devices is routed to second application 403-2*c* and corresponds to the visual component according to the navigation instruction of the navigation information. In various aspects, one or both of first application 403-1*c* and second application 403-2*c* may be sent navigation information. In another aspect, neither first application 403-1*c* nor second application 403-2*c* may be sent navigation information. Rather, navigation information may be sent to a component of GUI subsystem 437*c*. For example, GUI subsystem 437*c* may change the transparency level of first app 604-1*c* visual component and assign input focus to second app 604-2*c* visual component in navigating to second app 604-2*c* visual component.

As described above, in response to navigating to a visual component, a navigation control, in a navigation region determined based on the application region of the visual component, may be presented for navigating from the visual component to another visual component. Thus some or all visual components of some or all operating applications in an execution environment may be presented with a navigation control for navigating to another visual component of the same and/or of a different application.

The method illustrated in FIG. 2 may include additional aspects supported by various adaptations and/or analogs of the arrangement of components in FIG. 3. In various aspects, a visual component may be included in and/or may include window, a dialog box, a textbox, a check box, a radio button, a slider, a list box, a drop-down list, a spinner, a menu, a menu item, a toolbar, a ribbon, a combo box, a tree view, a grid view, a navigation tab, a scrollbar, a label, a tooltip, a balloon, a slide-out control, a pop-up, a pop-over, a pop-under, and a sidebar, to name a few examples.

A first application presenting a first visual component may operate in a first process in an execution environment and a second application presenting a second visual component may operate in a second process in the execution environment. Further, the first and second application may be generated from different source code. The first application may be represented in a processor memory by at least a portion of a first program generated from first source code and the second application may be represented in a processor memory by at least a portion of a second program generated from second source code Detecting a visual component may include detecting a measure of visibility of the first visual component to a user. A measure of visibility may be based on at least one of a z-order, an attribute of a font, a size, a location in the presentation space, a transparency attribute, and/or a size of a visible portion of a visual component. For example, in FIG. 4*c* PS monitor component 402*c* may receive information identifying a measure of visibility for any visual component processed by GUI subsystem 437*c*.

A navigation control for a visual component may be presented in response to a change detected in a visually detectable attribute of the visual component. For example, an application navigator component 404 in FIGS. 4*a-d* may be configured to hide a navigation control 614 in response to maximizing a corresponding app 604 visual component in a user interface of an application 403. When the app 604 visual component is restored to its non-maximized state, the application navigation component 404 may present a navigation control 614 for the app 604 visual component. The navigation control 614 may be presented automatically in response to an input and/or other instruction to present the app 604 visual component in its normal state, neither minimized nor maximized.

A navigation region may be determined based on a location of a visual component, a parent visual component of the visual component, and a child visual component of the visual component. For example, in FIG. 6a an application navigation component 404 in FIGS. 4a-d may determine a navigation region for second navigation control 614-2a where second navigation control 614-2a is a parent of second app 604-2a visual component and includes an application region of the visual component, second app 604-2a. FIG. 6b illustrates that an application navigation component 404 may determine a navigation region including navigation control 614-1b where the navigation region is adjacent to the application region of first app 604-1b visual component. FIG. 6e illustrates that an application navigation component 404 may determine a navigation region based on menu bar 608-1e included as a child visual component in first app 604-1e visual component.

A navigation region may be determined based on a border of a visual component, a parent visual component of the visual component, and a child visual component of the visual component. FIG. 6b and FIG. 6c illustrate navigation regions for navigation control 614-1b and navigation control 614-1c respectively determined based on a border of first app 604-1b visual component and first app 604-1c visual component. FIG. 6b and FIG. 6c further illustrate that a navigation region may share a border with an associated application region, may be at least partially included in the application region, and may be outside the application region.

In an aspect, a navigation control and/or an associated visual component may be at least partially transparent. A transparency attribute of the navigation control and/or the visual component may be responsive to a change in a position of a visual representation of an input pointer, a change in an input focus attribute associated with at least one of the navigation control and the visual component, and/or a transparency attribute of the respective visual component and/or the navigation control. A navigation element handler component 406 in FIGS. 4a-d may be configured to manage the transparency of a navigation control and may further interoperate with a UI element handler component 433 and/or a graphics subsystem 439 to manage transparency of a corresponding visual component.

Presenting a navigation control may include detecting the navigation control presented in a previous navigation region determined based on a corresponding application region. Presenting may further include detecting a move indication (in response to a detected user input), and determining the navigation region based on at least one of a current application region and the previous navigation region. A navigation region may be determined based on the move indication. Further, presenting the navigation control may include determining that a corresponding application region differs from a previous application region in the presentation space, which includes a visual component that corresponded to the navigation region prior to the presenting. Presenting may further include presenting the navigation control in the navigation region from a previous navigation region determined based on the previous application region.

For example, an application navigation component 404 and/or a navigation element handler component 406 may be configured to minimize movement of a navigation control 614 and present the navigation control 614 along a border of a corresponding visual component. When the visual component is moved and/or resized, the application navigation component 404 and/or a navigation element handler component 406 determine a navigation region to include the moved and/or resized navigation control 614 based on the previous navigation region and based on the new application region. Alternatively or additionally, a first input may indicate that a navigation control is to be presented adjacent to a first border of a visual component and a second input may indicate that the navigation control is to be presented as a child visual component of the visual component.

As described above, an application control and/or a visual component control may be included in and/or activated for receiving input based on a state of a corresponding application and/or a state of a visual component of the corresponding application. A state may indicate that an application and/or a visual component is minimized, hidden, partially hidden, suspended, blocked, and/or that access is not authorized.

An application control and/or a visual component control may be presented in a plurality including at least one of a plurality of application controls and a plurality of visual component controls based on a specified order of at least one of a plurality of applications corresponding to the plurality of application controls and a plurality of visual components corresponding to the plurality of visual component controls. A specified order may be based on a time attribute, an application identifier, a z-order attribute, a size attribute, a color attribute, a font, a state of a process context for an application, a state of a thread context in the process context, and/or a user-assigned order.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method for navigating between visual components, the method comprising:
   detecting, in a first application region of a presentation space of a display device, a first visual component of a first operating application in a plurality of operating applications;
   presenting a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component;
   detecting a user input corresponding to the first navigation control; and
   sending, in response to detecting the user input, navigation information to navigate to the second visual component.

2. The method of claim 1 wherein the first navigation control is automatically presented in response to a presenting of the first visual component.

3. The method of claim 1 wherein the first navigation control is presented in response to a navigation-activate input received from a user.

4. The method of claim 1 wherein the first navigation control is presented in response to a change detected in a visually detectable attribute of the first visual component.

5. The method of claim 1 wherein a transparency attribute of the first navigation control is responsive to a change in at least one of a position of a visual representation of an input pointer, a change in an input focus attribute associated with at least one of the first navigation control and the first visual component, and a transparency attribute of the first visual component.

6. The method of claim 1 wherein presenting the first navigation control further comprises:
   presenting at least one of a second application control corresponding to the second application and a second visual component control corresponding to the second visual component; and
   detecting the user input includes determining that the user input corresponds to at least one of the second application control and the second visual component control.

7. The method of claim 6 wherein the at least one of the second application control and the second visual component control is presented based on a state of at least one of the second application and the second visual component.

8. The method of claim 7 wherein the state indicates that the at least one of the second application and the second visual component is at least one of minimized, hidden, at least partially hidden, suspended, blocked, and configured so that access is not authorized.

9. The method of claim 6 wherein at least one of the second application control and the second visual component control is presented in a plurality including at least one of a plurality of application controls and a plurality of visual component controls based on a specified order of at least one of a plurality of applications corresponding to the plurality of application controls and a plurality of visual components corresponding to the plurality of visual component controls.

10. The method of claim 9 wherein the specified order is based on at least one of a time attribute, an application identifier, a z-order attribute, a size attribute, a color attribute, a font, a state of a process context for an application, a state of a thread context in a process context, and a user-assigned order.

11. The method of claim 1 wherein the navigation information includes information for changing at least one of a z-order, input focus, size, location, font, color, and transparency level of at least one of the first visual component and the second visual component.

12. The method of claim 1 further comprising presenting, based on the navigation information, a second navigation control, in a second navigation region determined based on the second application region, for navigating away from the second visual component to another visual component of another application in the plurality.

13. A method for navigating between visual components, the method comprising:
   detecting, in a first application region of a presentation space of a display device, a first visual component of a first operating application in a plurality of operating applications;
   presenting a first navigation control, in a first navigation region determined based on the first application region, for navigating to a second visual component, of a second application in the plurality, in a second application region in the presentation space, wherein presenting the first navigation control comprises:

a) detecting the first navigation control presented in a previous navigation region, determined based on the first application region;
b) detecting a move indication; and
c) determining the first navigation region based on the first application region and based on at least one of the previous navigation region and the move indication;

detecting a user input corresponding to the first navigation control; and sending, in response to detecting the user input, navigation information to navigate to the second visual component.

14. The method of claim 13 wherein the first navigation control is automatically presented in response to a presenting of the first visual component.

15. The method of claim 13 wherein the first navigation control is presented in response to a navigation-activate input received from a user.

16. The method of claim 13 wherein the first navigation control is presented in response to a change detected in a visually detectable attribute of the first visual component.

17. A system for navigating between visual components, the system comprising:
    a processor that executes an instruction included in at least one of a presentation space monitor component, an application navigator component, a navigation element handler component, and a navigation director component during operation of the system;
    the presentation space monitor component that during operation of the system detects, in a first application region of a presentation space of a display device, a first visual component of a first operating application in a plurality of operating applications;
    the application navigator component that during operation of the system presents a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component;
    the navigation element handler component that during operation of the system detects a user input corresponding to the first navigation control; and
    the navigation director component that during operation of the system sends, in response to detecting the user input, navigation information to navigate to the second visual component.

18. A non-transitory computer-readable medium embodying a computer program, executable by a machine, for navigating between visual components, the computer program comprising executable instructions for:
    detecting, in a first application region of a presentation space of a display device, a first visual component of a first operating application in a plurality of operating applications;
    presenting a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component;
    detecting a user input corresponding to the first navigation control; and
    sending, in response to detecting the user input, navigation information to navigate to the second visual component.

19. A system for navigating between visual components, the system comprising:
    a processor that executes an instruction included in at least one of a presentation space monitor component, an application navigator component, a navigation element handler component, and a navigation director component during operation of the system;
    the presentation space monitor component that during operation of the system detects, in a first application region of a presentation space of a display device, a first visual component of a first operating application in a plurality of operating applications;
    the application navigator component that during operation of the system presents a first navigation control, in a first navigation region determined based on the first application region, for navigating to a second visual component, of a second application in the plurality, in a second application region in the presentation space, wherein presenting the first navigation control comprises:
        a) detecting the first navigation control presented in a previous navigation region, determined based on the first application region;
        b) detecting a move indication; and
        c) determining the first navigation region based on the first application region and based on at least one of the previous navigation region and the move indication;
    the navigation element handler component that during operation of the system detects a user input corresponding to the first navigation control; and
    the navigation director component that during operation of the system sends, in response to detecting the user input, navigation information to navigate to the second visual component.

20. A non-transitory computer-readable medium embodying a computer program, executable by a machine, for navigating between visual components, the computer program comprising executable instructions for:
    detecting, in a first application region of a presentation space of a display device, a first visual component of a first operating application in a plurality of operating applications;
    presenting a first navigation control, in a first navigation region determined based on the first application region, for navigating to a second visual component, of a second application in the plurality, in a second application region in the presentation space, wherein presenting the first navigation control comprises:
        a) detecting the first navigation control presented in a previous navigation region, determined based on the first application region;
        b) detecting a move indication; and
        c) determining the first navigation region based on the first application region and based on at least one of the previous navigation region and the move indication;
    detecting a user input corresponding to the first navigation control; and
    sending, in response to detecting the user input, navigation information to navigate to the second visual component.

21. A computer program product embodied on a non-transitory computer-readable medium comprising:
    code for presenting, in a first application region of a presentation space of a display device, a first visual component of a first network application in a plurality of network applications accessible via at least one platform associated with a single application provider;

code for presenting a first navigation control, in a first navigation region determined based on the first application region, for navigating to a second visual component, of a second network application in the plurality, in a second application region in the presentation space, wherein the first navigation region is determined based on a location of at least one of the first visual component, a parent visual component of the first visual component, and a child visual component of the first visual component;

code for detecting a user input corresponding to the first navigation control; and code for sending, in response to detecting the user input, navigation information to navigate to the second visual component.

22. The computer program product of claim 21 wherein the computer program product is operable such that the first navigation control includes a drop down interface including a plurality of application controls in an order that is capable of being assigned by a user.

23. The computer program product of claim 21 wherein the computer program product is operable such that the plurality of network applications are associated with a web service and are capable of dynamically retrieving data from at least one database based on requests.

24. The computer program product of claim 21 wherein the computer program product is operable such that the first navigation control is sent utilizing a hypertext transfer protocol (HTTP).

25. The computer program product of claim 21 wherein the computer program product is operable such that the first navigation control is sent utilizing a hypertext transfer protocol (HTTP) for presentation utilizing a hypertext markup language (HTML) via a drop down interface that is included for allowing convenient switching among a plurality of updated visual components of the plurality of network applications.

26. The computer program product of claim 21 wherein the computer program product is operable such that the second visual component is a function of both a user and an execution environment associated with the at least one platform.

27. The computer program product of claim 21 wherein the computer program product is operable such that the first navigation control is presented as a toolbar that is included, at least in part, in the first application region.

28. The computer program product of claim 21 wherein the computer program product is operable such that the first navigation control is presented in response to a navigation-activate input received from a user.

29. The computer program product of claim 28 wherein the computer program product is operable such that the first navigation control is presented as a toolbar that is included, at least in part, in the first application region.

30. The computer program product of claim 28 wherein the computer program product is operable such that the first navigation control is presented as a toolbar that is included completely in the first application region.

31. The computer program product of claim 28 wherein the computer program product is operable such that the first navigation control is presented as a toolbar that is included, at least in part, in a first application window.

32. The computer program product of claim 28 wherein the computer program product is operable such that the first navigation control is presented as a toolbar that is included completely in a first application window.

33. The computer program product of claim 21 and further comprising code for presenting a second navigation control, in a second navigation region determined based on a second application region.

34. The computer program product of claim 21 wherein the computer program product is operable such that a second application control is presented in connection with the first navigation control.

35. The computer program product of claim 34 wherein the computer program product is operable such that the second application control is presented based on a state of at least one of the second network application and the second visual component.

36. The computer program product of claim 35 wherein the computer program product is operable such that the state indicates that the at least one of the second network application and the second visual component is at least one of minimized, hidden, at least partially hidden, suspended, blocked, and configured so that access is not authorized.

37. The computer program product of claim 34 wherein the computer program product is operable such that the second application control is presented with a plurality of application controls based on a specified order of the network applications.

38. The computer program product of claim 37 wherein the computer program product is operable such that the specified order is based on at least one of a time attribute, an application identifier, a z-order attribute, a size attribute, a color attribute, a font, a state of a process context for an application, a state of a thread context in a process context, and a user-assigned order.

39. The computer program product of claim 37 wherein the computer program product is operable such that the specified order is based on a state of a process context for an application.

40. The computer program product of claim 37 wherein the computer program product is operable such that the specified order is based on a state of a thread context in a process context.

41. The computer program product of claim 37 wherein the computer program product is operable such that the specified order is based on a user-assigned order.

42. The computer program product of claim 21 wherein the computer program product is operable such that a second visual component control is presented in connection with the first navigation control.

43. The computer program product of claim 42 wherein the computer program product is operable such that the second visual component control is presented based on a state of at least one of the second network application and the second visual component.

44. The computer program product of claim 43 wherein the computer program product is operable such that the state indicates that the at least one of the second network application and the second visual component is at least one of minimized, hidden, at least partially hidden, suspended, blocked, and configured so that access is not authorized.

45. The computer program product of claim 42 wherein the computer program product is operable such that the second visual component control is presented with a plurality of visual component controls based on a specified order of the network applications.

46. The computer program product of claim 45 wherein the computer program product is operable such that the specified order is based on at least one of a time attribute, an application identifier, a z-order attribute, a size attribute, a color attribute, a font, a state of a process context for an application, a state of a thread context in a process context, and a user-assigned order.

47. The computer program product of claim 45 wherein the computer program product is operable such that the specified order is based on a state of a process context for an application.

48. The computer program product of claim 45 wherein the computer program product is operable such that the specified order is based on a state of a thread context in a process context.

49. The computer program product of claim 45 wherein the computer program product is operable such that the specified order is based on a user-assigned order.

50. The computer program product of claim 21 wherein the computer program product is operable such that the first navigation control is sent utilizing a hypertext transfer protocol (HTTP) for presentation, in response to a user selection of an icon, utilizing a hypertext markup language (HTML) via a drop down interface that is included, at least in part, in the first application region for allowing switching among a plurality of updated visual components of the plurality of network applications, the plurality of network applications being associated with a web service and being capable of dynamically retrieving data from at least one database based on requests, the first navigation control including a plurality of application controls in an order that is capable of being assigned by a user, and the second visual component is a function of both a user and an execution environment associated with the at least one platform.

51. The computer program product of claim 21 wherein the computer program product is operable such that the first navigation control is presented, in response to a user selection of an icon, via a drop down interface of a network browser menu bar for allowing switching among a plurality of updated visual components of the plurality of network applications, the plurality of network applications being associated with a web service and being capable of dynamically retrieving data from at least one database based on requests, and the second visual component is a function of both a user and an execution environment associated with the at least one platform.

52. The computer program product of claim 21 wherein the computer program product is operable such that the first navigation control is presented, in response to a user selection of an icon, via a drop down interface of a network browser menu bar for allowing switching among a plurality of updated visual components of the plurality of network applications, the plurality of network applications being associated with a web service and being capable of dynamically retrieving data from at least one database based on requests, and the second visual component is a function of both a user and an execution environment associated with the at least one platform.

53. The computer program product of claim 21 wherein the computer program product is operable such that the first navigation control is capable of being presented utilizing a network browser.

54. The computer program product of claim 21 and further comprising: a network browser for working in association with the at least one platform for presenting the first navigation control.

55. The computer program product of claim 21 wherein the single application provider utilizes a single application provider node.

56. The computer program product of claim 21 wherein the at least one platform includes at least one network application platform.

57. The computer program product of claim 21 wherein the computer program product is operable such that the first navigation region is determined based on the location of the first visual component.

58. The computer program product of claim 21 wherein the computer program product is operable such that the first navigation region is determined based on the location of the parent visual component of the first visual component.

59. The computer program product of claim 21 wherein the computer program product is operable such that the first navigation region is determined based on the location of the child visual component of the first visual component.

60. The computer program product of claim 21 wherein the computer program product is operable such that the first navigation region is determined based on the location, where the location includes the location of a user-selectable visual component.

61. The computer program product of claim 21 wherein the computer program product is operable such that the first network application is represented by a first program generated from first source code and the second network application is represented by a second program generated from second source code.

62. The computer program product of claim 21 wherein the computer program product is operable such that the first navigation control is automatically presented in response to a presenting of the first visual component.

63. The computer program product of claim 21 wherein the computer program product is operable such that the first navigation control is presented in response to a change detected in a visually detectable attribute of the first visual component.

64. The computer program product of claim 21 wherein the computer program product is operable such that the first navigation control is at least partially transparent.

65. The computer program product of claim 64 wherein the computer program product is operable such that a transparency attribute of the first navigation control is responsive to a change in at least one of a position of a visual representation of an input pointer, a change in an input focus attribute associated with at least one of the first navigation control and the first visual component, and a transparency attribute of the first visual component.

66. The computer program product of claim 21 wherein the computer program product is operable such that the sending the navigation information includes sending via at least one of invoking at least one of a function, a method, and a subroutine; sending a message via a network; sending a message via an inter-process communication (IPC), and exchanging information via a shared data area.

67. The computer program product of claim 21 wherein the computer program product is operable such that the navigation information includes information for changing at least one of a z-order, input focus, size, location, font, color, and transparency level of at least one of the first visual component and the second visual component.

68. A computer program product embodied on a non-transitory computer-readable medium comprising:
    code for presenting, in a first application region of a presentation space of a display device, a first visual component of a first network application in a plurality of network applications;
    code for presenting a first navigation control utilizing a hypertext markup language (HTML), in a first navigation region determined based on the first application region, for navigating to a second visual component, of a second network application in the plurality, in a second application region in the presentation space, wherein the first navigation region is determined based on a location of at least one of the first visual component, a parent visual component of the first visual component, and a child visual component of the first visual component;

code for detecting a user input corresponding to the first navigation control; and code for sending, in response to detecting the user input, navigation information to navigate to the second visual component.

69. The computer program product of claim 68 wherein the computer program product is operable such that the first navigation control includes a drop down interface including a plurality of application controls in an order that is capable of being assigned by a user.

70. The computer program product of claim 68 wherein the computer program product is operable such that the plurality of network applications are associated with a web service and are capable of dynamically retrieving data from at least one database based on requests.

71. The computer program product of claim 68 wherein the computer program product is operable such that the first navigation control is sent utilizing a hypertext transfer protocol (HTTP).

72. The computer program product of claim 68 wherein the computer program product is operable such that the first navigation control is sent utilizing a hypertext transfer protocol (HTTP) for presentation via a drop down interface for allowing convenient switching among a plurality of up-to-date visual components of the plurality of network applications.

73. The computer program product of claim 68 wherein the computer program product is operable such that the second visual component is a function of both a user and an execution environment.

74. The computer program product of claim 68 wherein the computer program product is operable such that the first navigation control is presented as a toolbar that is included, at least in part, in the first application region.

75. The computer program product of claim 68 wherein the computer program product is operable such that the first navigation control is presented in response to a navigation-activate input received from a user.

76. The computer program product of claim 75 wherein the computer program product is operable such that the first navigation control is presented as a toolbar that is included, at least in part, in the first application region.

77. The computer program product of claim 75 wherein the computer program product is operable such that the first navigation control is presented as a toolbar that is included completely in the first application region.

78. The computer program product of claim 75 wherein the computer program product is operable such that the first navigation control is presented as a toolbar that is included, at least in part, in a first application window.

79. The computer program product of claim 75 wherein the computer program product is operable such that the first navigation control is presented as a toolbar that is included completely in a first application window.

80. The computer program product of claim 68 and further comprising code for presenting a second navigation control, in a second navigation region determined based on a second application region.

81. The computer program product of claim 68 wherein the computer program product is operable such that a second application control is presented in connection with the first navigation control.

82. The computer program product of claim 81 wherein the computer program product is operable such that the second application control is presented based on a state of at least one of the second network application and the second visual component.

83. The computer program product of claim 82 wherein the computer program product is operable such that the state indicates that the at least one of the second network application and the second visual component is at least one of minimized, hidden, at least partially hidden, suspended, blocked, and configured so that access is not authorized.

84. The computer program product of claim 81 wherein the computer program product is operable such that the second application control is presented with a plurality of application controls based on a specified order of the network applications.

85. The computer program product of claim 84 wherein the computer program product is operable such that the specified order is based on an application identifier.

86. The computer program product of claim 84 wherein the computer program product is operable such that the specified order is based on a state of a process context for an application.

87. The computer program product of claim 84 wherein the computer program product is operable such that the specified order is based on a state of a thread context in a process context.

88. The computer program product of claim 84 wherein the computer program product is operable such that the specified order is based on a user-assigned order.

89. The computer program product of claim 68 wherein the computer program product is operable such that a second visual component control is presented in connection with the first navigation control.

90. The computer program product of claim 89 wherein the computer program product is operable such that the second visual component control is presented based on a state of at least one of the second network application and the second visual component.

91. The computer program product of claim 89 wherein the computer program product is operable such that the second visual component control is presented based on a state of the second visual component.

92. The computer program product of claim 89 wherein the computer program product is operable such that the second visual component control is presented with a plurality of visual component controls based on a specified order of the network applications.

93. The computer program product of claim 92 wherein the computer program product is operable such that the specified order is based on an application identifier.

94. The computer program product of claim 92 wherein the computer program product is operable such that the specified order is based on a state of a process context for an application.

95. The computer program product of claim 92 wherein the computer program product is operable such that the specified order is based on a state of a thread context in a process context.

96. The computer program product of claim 92 wherein the computer program product is operable such that the specified order is based on a user-assigned order.

97. The computer program product of claim 68 wherein the computer program product is operable such that the first navigation control is sent utilizing the hypertext transfer protocol (HTTP) for presentation, in response to a user selection of an icon, via a drop down interface that is included, at least in part, in the first application region for allowing switching among a plurality of update active visual components of the plurality of network applications, the plurality of network applications being associated with a web service and being capable of dynamically retrieving data from at least one database based on requests, the first navigation control including a plurality of application controls in an order that is capable of being assigned by a user, and the second visual component being a function of both a user and an execution environment.

98. The computer program product of claim 68 wherein the computer program product is operable such that the first navigation control is presented, in response to a user selection of an icon, via a drop down interface that is included, at least in part, in the first application region for allowing one-click switching among a plurality of up-to-date visual components of the plurality of network applications which are operating, the plurality of network applications being associated with a web service and being capable of dynamically retrieving data from at least one database based on requests, and the second visual component being a function of both a user and an execution environment.

99. The computer program product of claim 68 wherein the computer program product is operable such that the first navigation control is presented, in response to a user selection of an icon, via a drop down interface of a network browser grid menu for allowing switching among a plurality of updated visual components of the plurality of network applications, the plurality of network applications being associated with a web service and being capable of dynamically retrieving data from at least one database based on requests, and the second visual component being a function of both a user and an operating execution environment.

100. The computer program product of claim 68 wherein the computer program product is operable such that the first navigation control is capable of being presented utilizing a network browser.

101. The computer program product of claim 68 and further comprising: a network browser for working in association with a platform for presenting the first navigation control via a network browser menu.

102. The computer program product of claim 68 wherein the computer program product is operable such that the first navigation region is determined based on the location of the first visual component.

103. The computer program product of claim 68 wherein the computer program product is operable such that the first navigation region is determined based on the location of the parent visual component of the first visual component.

104. The computer program product of claim 68 wherein the computer program product is operable such that the first navigation region is determined based on the location of the child visual component of the first visual component.

105. The computer program product of claim 68 wherein the computer program product is operable such that the first navigation region is determined based on the location, where the location includes the location of a user-selectable icon parent visual component.

106. The computer program product of claim 68 wherein the computer program product is operable such that the first navigation region is determined based on the location, where the location includes the location of a user-selectable icon associated with the first visual component.

107. The computer program product of claim 68 wherein the computer program product is operable such that the first navigation control is automatically presented in response to a presenting of the first visual component.

108. The computer program product of claim 68 wherein the computer program product is operable such that the first navigation control is presented in response to a user-prompted change in a visually detectable attribute of the first visual component.

109. The computer program product of claim 68 wherein the computer program product is operable such that the first navigation control is at least partially transparent.

110. The computer program product of claim 109 wherein the computer program product is operable such that a transparency attribute of the first navigation control is responsive to a change in an input focus attribute associated with at least one of the first navigation control and the first visual component.

111. The computer program product of claim 109 wherein the computer program product is operable such that a transparency attribute of the first navigation control is responsive to a change in a transparency attribute of the first visual component.

112. The computer program product of claim 68 wherein the computer program product is operable such that the navigation information includes information for changing an input focus of at least one of the first visual component and the second visual component.

113. A computer program product embodied on a non-transitory computer-readable medium comprising:
 code for presenting, in a first application region of a presentation space of a display device, a first visual component of a first application in a plurality of applications;
 code for presenting a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component;
 code for detecting a user input corresponding to the first navigation control; and
 code for sending, in response to detecting the user input, navigation information to navigate to the second visual component;
 wherein the computer program product is operable such that the first navigation control is presented, in response to a user selection, via an interface that is included in the first application region, for allowing switching among a plurality of updated visual components of the plurality of applications.

114. The computer program product of claim 113 wherein the computer program product is operable such that the first navigation control includes a drop down interface including a plurality of application controls in an order that is capable of being user manipulated.

115. The computer program product of claim 113 wherein the computer program product is operable such that the plurality of applications are associated with a web service and are capable of dynamically retrieving data from at least one database based on requests.

116. The computer program product of claim 113 wherein the computer program product is operable such that the first navigation control is sent utilizing a hypertext transfer protocol (HTTP).

117. The computer program product of claim 113 wherein the computer program product is operable such that the first navigation control is sent utilizing a hypertext transfer protocol (HTTP) for presentation utilizing the hypertext markup language (HTML) via a drop down interface that is included for allowing convenient switching.

118. The computer program product of claim 113 wherein the computer program product is operable such that the second visual component is up-to-date as a function of both a user and an active execution environment.

119. The computer program product of claim 113 wherein the computer program product is operable such that the first navigation control is presented as a toolbar that is included, at least in part, in the first application region.

120. The computer program product of claim 113 wherein the computer program product is operable such that the first navigation control is presented in response to a navigation-activate input received from a user.

121. The computer program product of claim 120 wherein the computer program product is operable such that the first navigation control is presented as a toolbar that is included, at least in part, over at least a portion of first application content in the first application region.

122. The computer program product of claim 120 wherein the computer program product is operable such that the first navigation control is presented as a toolbar that is included completely in the first application region over at least a portion of first application content.

123. The computer program product of claim 120 wherein the computer program product is operable such that the first navigation control is presented as a toolbar that is included, at least in part, in a first application window over at least a portion of first application content.

124. The computer program product of claim 120 wherein the computer program product is operable such that the first navigation control is presented as a toolbar that is included completely in a first application window.

125. The computer program product of claim 113 and further comprising code for presenting a second navigation control, in a second navigation region determined based on a second application region.

126. The computer program product of claim 113 wherein the computer program product is operable such that a second application control is presented in connection with the first navigation control.

127. The computer program product of claim 126 wherein the computer program product is operable such that the second application control is presented based on a state of at least one of the second application and the second visual component.

128. The computer program product of claim 127 wherein the computer program product is operable such that the state indicates that the at least one of the second application and the second visual component is configured.

129. The computer program product of claim 126 wherein the computer program product is operable such that the second application control is presented with a plurality of application controls based on a specified order of the applications.

130. The computer program product of claim 129 wherein the computer program product is operable such that the specified order is based on at least one of a time attribute, an application identifier, a z-order attribute, a size attribute, a color attribute, a font, a state of a process context for an application, a state of a thread context in a process context, and a user-assigned order.

131. The computer program product of claim 129 wherein the computer program product is operable such that the specified order is based on a state of a process context for an application.

132. The computer program product of claim 129 wherein the computer program product is operable such that the specified order is based on a state of a thread context in a process context.

133. The computer program product of claim 129 wherein the computer program product is operable such that the specified order is based on a user-assigned order.

134. The computer program product of claim 113 wherein the computer program product is operable such that a second visual component control is presented in connection with the first navigation control.

135. The computer program product of claim 134 wherein the computer program product is operable such that the second visual component control is presented based on a state of at least one of the second application and the second visual component.

136. The computer program product of claim 135 wherein the computer program product is operable such that the state indicates that the at least one of the second application and the second visual component is configured.

137. The computer program product of claim 134 wherein the computer program product is operable such that the second visual component control is presented with a plurality of visual component controls based on a specified order of the applications.

138. The computer program product of claim 137 wherein the computer program product is operable such that the specified order is based on an application state.

139. The computer program product of claim 137 wherein the computer program product is operable such that the specified order is based on a state of a process context for an application.

140. The computer program product of claim 137 wherein the computer program product is operable such that the specified order is based on a state of a thread context in a process context.

141. The computer program product of claim 137 wherein the computer program product is operable such that the specified order is based on a user-assigned order.

142. The computer program product of claim 113 wherein the computer program product is operable such that the first navigation control is sent utilizing a hypertext transfer protocol (HTTP) for presentation, in response to a user selection of an icon, utilizing a hypertext markup language (HTML) via a drop down interface that is included, at least in part, in the first application region for allowing context switching, the plurality of applications being associated with a web service and being capable of dynamically retrieving data from at least one database based on requests, the second visual component being a function of both a user and an active execution environment.

143. The computer program product of claim 113 wherein the computer program product is operable such that the first navigation control is presented, in response to a user selection of an icon, via a drop down interface that is included, at least in part, in the first application region for allowing context switching, the plurality of applications being associated with a web service and being capable of dynamically retrieving data from at least one database based on requests, and the second visual component is a function of both a user and an execution environment.

144. The computer program product of claim 113 wherein the computer program product is operable such that the first navigation control is presented, in response to a user selection of an icon, via a drop down interface of a network browser menu grid for allowing context switching, the plurality of applications being associated with a web service and being capable of dynamically retrieving data from at least one database based on requests, and the second visual component is a function of both a user and an execution environment.

145. The computer program product of claim 113 wherein the computer program product is operable such that the first navigation control is capable of being presented utilizing a network browser drop down grid menu that is presented in response to a selection of an icon.

146. The computer program product of claim 113 and further comprising: a network browser for working in association with at least one platform for presenting the first navigation control.

147. The computer program product of claim 113 wherein the computer program product is operable such that the first navigation region is determined based on the location of the first visual component.

148. The computer program product of claim 113 wherein the computer program product is operable such that the first navigation region is determined based on the location of the parent visual component of the first visual component.

149. The computer program product of claim 113 wherein the computer program product is operable such that the first navigation region is determined based on the location of the parent visual component which takes the form of a network browser interface.

150. The computer program product of claim 113 wherein the computer program product is operable such that the first navigation region is determined based on the location of the child visual component of the first visual component.

151. The computer program product of claim 113 wherein the computer program product is operable such that the first navigation region is determined based on the location, where the location includes the location of a user-selectable icon visual component.

152. The computer program product of claim 113 wherein the computer program product is operable such that the first navigation control is automatically presented in response to a presenting of the first visual component.

153. The computer program product of claim 113 wherein the computer program product is operable such that the first navigation control is presented in response to a change detected in a visually detectable attribute of the first visual component.

154. The computer program product of claim 113 wherein the first navigation region is determined based on the location of the at least one of the first visual component, by being presented next to an icon that is selectable by a user.

155. The computer program product of claim 113 wherein the first navigation region is determined based on the location of the parent visual component of the first visual component, by being presented next to an icon that is selectable by a user.

156. The computer program product of claim 113 wherein the first navigation region is determined based on the location of the child visual component of the first visual component, by being presented next to an icon that is selectable by a user.

157. The computer program product of claim 113 wherein the computer program product is operable such that the first navigation control is at least partially transparent.

158. The computer program product of claim 113 wherein the computer program product is operable such that the first navigation region moves with the first application region.

159. The computer program product of claim 113 wherein the computer program product is operable such that the first navigation region moves in response to a user moving the first application region.

160. A computer program product embodied on a non-transitory computer-readable medium comprising:

code for presenting, in a first application region of a presentation space of a display device, a first visual component of a first network application in a plurality of network applications;

code for presenting a first navigation control, in a first navigation region determined based on the first application region, for navigating to a second visual component, of a second network application in the plurality, in a second application region in the presentation space, wherein the first navigation region is determined based on a location of at least one of the first visual component, a parent visual component of the first visual component, and a child visual component of the first visual component;

code for detecting a user input corresponding to the first navigation control; and code for sending, in response to detecting the user input, navigation information to navigate to the second visual component;

wherein the computer program product is operable such that the plurality of network applications are associated with at least one web service and are capable of dynamically retrieving data from at least one database based on requests, the first visual component and the second visual component being a function of both a user and an execution environment.

161. The computer program product of claim 160 wherein the computer program product is operable such that the first navigation control includes a drop down interface including a plurality of application controls in an order that is capable of being assigned by a user.

162. The computer program product of claim 160 wherein the computer program product is operable such that the first navigation region moves with the first application region.

163. The computer program product of claim 160 wherein the computer program product is operable such that the first navigation region moves in response to a user moving the first application region.

164. The computer program product of claim 160 wherein the computer program product is operable such that the first navigation control is sent utilizing a hypertext transfer protocol (HTTP).

165. The computer program product of claim 160 wherein the computer program product is operable such that the first navigation control is sent utilizing a hypertext transfer protocol (HTTP) for presentation utilizing a hypertext markup language (HTML) via a drop down interface that is included for allowing convenient switching among a plurality of updated visual components of the plurality of network applications.

166. The computer program product of claim 160 wherein the computer program product is operable such that the first navigation control is presented as a toolbar that is included, at least in part, in the first application region.

167. The computer program product of claim 160 wherein the computer program product is operable such that the first navigation control is presented in response to a navigation-activate input received from a user.

168. The computer program product of claim 167 wherein the computer program product is operable such that the first navigation control is presented as a toolbar that is included, at least in part, in the first application region.

169. The computer program product of claim 167 wherein the computer program product is operable such that the first navigation control is presented as a toolbar that is included completely in the first application region.

170. The computer program product of claim 167 wherein the computer program product is operable such that the first navigation control is presented as a toolbar that is included, at least in part, in a first application window.

171. The computer program product of claim 167 wherein the computer program product is operable such that the first navigation control is presented as a toolbar that is included completely in a first application window.

172. The computer program product of claim 160 and further comprising code for presenting a second navigation control, in a second navigation region determined based on a second application region.

173. The computer program product of claim 160 wherein the computer program product is operable such that a second application control is presented in connection with the first navigation control.

174. The computer program product of claim 173 wherein the computer program product is operable such that the second application control is presented based on a state of at least one of the second network application and the second visual component.

175. The computer program product of claim 173 wherein the computer program product is operable such that the second application control is presented with a plurality of application controls based on a specified order of the network applications.

176. The computer program product of claim 175 wherein the computer program product is operable such that the specified order is based on a state of a process context for an application.

177. The computer program product of claim 175 wherein the computer program product is operable such that the specified order is based on a state of a thread context in a process context.

178. The computer program product of claim 175 wherein the computer program product is operable such that the specified order is based on a user-assigned order.

179. The computer program product of claim 160 wherein the computer program product is operable such that a second visual component control is presented in connection with the first navigation control.

180. The computer program product of claim 179 wherein the computer program product is operable such that the second visual component control is presented based on a state of at least one of the second network application and the second visual component.

181. The computer program product of claim 179 wherein the computer program product is operable such that the second visual component control is presented with a plurality of visual component controls based on a specified order of the network applications.

182. The computer program product of claim 181 wherein the computer program product is operable such that the specified order is based on a state of a process context for an application.

183. The computer program product of claim 181 wherein the computer program product is operable such that the specified order is based on a state of a thread context in a process context.

184. The computer program product of claim 181 wherein the computer program product is operable such that the specified order is based on a user-assigned order.

185. The computer program product of claim 160 wherein the computer program product is operable such that the first navigation control is sent utilizing a hypertext transfer protocol (HTTP) for presentation, in response to a user selection of an icon, utilizing a hypertext markup language (HTML) via a drop down interface that is included, at least in part, in the first application region for allowing switching among a plurality of updated visual components of the plurality of network applications.

186. The computer program product of claim 160 wherein the computer program product is operable such that the first navigation control is at least partially transparent.

187. The computer program product of claim 160 wherein the computer program product is operable such that the first navigation region moves with the first application region.

188. The computer program product of claim 160 wherein the computer program product is operable such that the first navigation region moves in response to a user moving the first application region.

189. The computer program product of claim 160 and further comprising: a network browser for working in association with the at least one platform for presenting the first navigation control.

190. The computer program product of claim 160 wherein the computer program product is operable such that the first navigation region is determined based on the location of the first visual component.

191. The computer program product of claim 160 wherein the computer program product is operable such that the first navigation region is determined based on the location of the parent visual component of the first visual component.

192. The computer program product of claim 160 wherein the computer program product is operable such that the first navigation region is determined based on the location of the child visual component of the first visual component.

193. The computer program product of claim 160 wherein the computer program product is operable such that the first navigation region is determined based on the location, where the location includes the location of a user-selectable icon visual component.

194. The computer program product of claim 160 wherein the computer program product is operable such that the first navigation control is automatically presented in response to a presenting of the first visual component.

195. The computer program product of claim 160 wherein the computer program product is operable such that the first navigation control is presented in response to a change detected in a visually detectable attribute of the first visual component.

196. The computer program product of claim 160 wherein the first navigation region is determined based on the location of the at least one of the first visual component, by being presented next to an icon that is selectable by a user.

197. The computer program product of claim 160 wherein the first navigation region is determined based on the location of the parent visual component of the first visual component, by being presented next to an icon that is selectable by a user.

198. The computer program product of claim 160 wherein the first navigation region is determined based on the location of the child visual component of the first visual component, by being presented next to an icon that is selectable by a user.

199. A computer program product embodied on a non-transitory computer-readable medium comprising:
code for presenting, in a first application region of a presentation space of a display device, a first visual component of a first application in a plurality of applications;
code for presenting a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component, the first navigation control including a representation of the second visual component;

code for detecting a user input corresponding to the first navigation control; and code for sending, in response to detecting the user input, navigation information to navigate to the second visual component.

200. The computer program product of claim 199 wherein the computer program product is operable such that the first navigation control includes an interface including a plurality of application controls side-by-side in an order that is based on a user.

201. The computer program product of claim 199 wherein the computer program product is operable such that the first navigation control moves with the first application region.

202. The computer program product of claim 199 wherein the computer program product is operable such that the first navigation control moves in response to a user moving the first application region.

203. The computer program product of claim 199 wherein the computer program product is operable such that the representation of the second visual component provides information about the second visual component.

204. The computer program product of claim 199 wherein the computer program product is operable such that the representation of the second visual component is accompanied by second application indicia.

205. The computer program product of claim 199 wherein the computer program product is operable such that the first navigation control is presented outside a first application window.

206. The computer program product of claim 199 wherein the computer program product is operable such that the first navigation control is presented in response to a navigation-activate input received from a user in connection with a key.

207. The computer program product of claim 206 wherein the computer program product is operable such that the first navigation control is presented outside the first application region.

208. The computer program product of claim 206 wherein the computer program product is operable such that the first navigation control is presented completely outside the first application region.

209. The computer program product of claim 199 and further comprising code for presenting a second navigation control, in a second navigation region determined based on a second application region.

210. The computer program product of claim 199 wherein the computer program product is operable such that a second application control is presented in connection with the first navigation control.

211. The computer program product of claim 210 wherein the computer program product is operable such that the second application control is presented based on a state of the second application.

212. The computer program product of claim 210 wherein the computer program product is operable such that the second application control is presented based on a state of the second visual component.

213. The computer program product of claim 210 wherein the computer program product is operable such that the second application control is presented based on a state of both the second application and the second visual component.

214. The computer program product of claim 210 wherein the computer program product is operable such that the second application control is presented with a plurality of application controls based on a specified order of the applications.

215. The computer program product of claim 214 wherein the computer program product is operable such that the specified order is based on a state of a process context for an application.

216. The computer program product of claim 214 wherein the computer program product is operable such that the specified order is based on a state of a thread context in a process context.

217. The computer program product of claim 214 wherein the computer program product is operable such that the specified order is based on a user-dictated order.

218. The computer program product of claim 199 wherein the computer program product is operable such that a second visual component control is presented in connection with the first navigation control.

219. The computer program product of claim 218 wherein the computer program product is operable such that the second visual component control is presented based on a state of at least one of the second application and the second visual component.

220. The computer program product of claim 218 wherein the computer program product is operable such that the second visual component control is presented with a plurality of visual component controls based on a specified order of the applications.

221. The computer program product of claim 220 wherein the computer program product is operable such that the specified order is based on a state of a process context for the applications.

222. The computer program product of claim 220 wherein the computer program product is operable such that the specified order is based on a state of a thread context in a process context associated with the applications.

223. The computer program product of claim 220 wherein the computer program product is operable such that the specified order is based on at least one aspect of a user.

224. The computer program product of claim 199 wherein the computer program product is operable such that the first navigation control is presented in response to an interaction with a hot key.

225. The computer program product of claim 199 wherein the computer program product is operable such that the first navigation control is presented, in response to a user action, via an interface that is outside the first application region, for allowing switching among a plurality of updated visual components of the plurality of applications which are operating.

226. The computer program product of claim 199 wherein the computer program product is operable such that the first navigation region is determined based on the location of the first visual component.

227. The computer program product of claim 199 wherein the computer program product is operable such that the first navigation region is determined based on the location of the parent visual component of the first visual component.

228. The computer program product of claim 199 wherein the computer program product is operable such that the first navigation region is determined based on the location of the child visual component of the first visual component.

229. The computer program product of claim 199 wherein the computer program product is operable such that the first navigation control is presented, in response to a user action, via an interface that is outside the first application region, for allowing switching among a plurality of updated visual components of the plurality of active applications.

230. The computer program product of claim 199 wherein the computer program product is operable such that the first navigation control is presented, in response to a user action, via an interface that includes a plurality application indicia and a plurality of visual component representations situated side-by-side, at least in part, and is outside the first application region, for allowing switching among a plurality of updated visual components of the plurality of applications.

231. The computer program product of claim 199 wherein the computer program product is operable such that the first navigation control is presented in response to a change detected in a visually detectable attribute of the first visual component.

232. The computer program product of claim 199 wherein the computer program product is operable such that the first navigation control is at least partially transparent.

233. The computer program product of claim 199 wherein the computer program product is operable such that the first navigation region moves with the first application region.

234. The computer program product of claim 199 wherein the computer program product is operable such that the first navigation region moves in response to a user moving the first application region.

235. The computer program product of claim 199 wherein the computer program product is operable such that the first navigation region moves as a function of a movement of the first application region.

236. A computer program product embodied on a non-transitory computer-readable medium comprising:
code for presenting, in a first application region of a presentation space of a display device, a first visual component of a first application in a plurality of operating applications;
code for presenting a first navigation control, in a first navigation region determined based on the first application region, for navigating to a second visual component, of a second application in the plurality, in a second application region in the presentation space, wherein the first navigation region is determined based on a location of at least one of the first visual component, a parent visual component of the first visual component, and a child visual component of the first visual component;
code for detecting a user input corresponding to the first navigation control; and
code for sending, in response to detecting the user input, navigation information to navigate to the second visual component.

237. The computer program product of claim 236 wherein the computer program product is operable such that the first navigation control includes an interface including a plurality of application controls side-by-side in an order that is a function of a user.

238. The computer program product of claim 236 wherein the computer program product is operable such that the first navigation region moves with the first application region.

239. The computer program product of claim 236 wherein the computer program product is operable such that the first navigation region moves in response to a user moving the first application region.

240. The computer program product of claim 236 wherein the computer program product is operable such that the representation of the second visual component provides information about the second visual component.

241. The computer program product of claim 236 wherein the computer program product is operable such that the representation of the second visual component is accompanied by second application indicia.

242. The computer program product of claim 236 wherein the computer program product is operable such that the first navigation control is presented outside the first application region.

243. The computer program product of claim 236 wherein the computer program product is operable such that the first navigation control is presented in response to a navigation-activate input received from a user in connection with a key.

244. The computer program product of claim 236 wherein the computer program product is operable such that the first navigation control is presented to the side of the first application region.

245. The computer program product of claim 236 wherein the computer program product is operable such that the first navigation control is presented completely outside the first application region.

246. The computer program product of claim 236 and further comprising code for presenting a second navigation control, in a second navigation region determined based on a second application region.

247. The computer program product of claim 236 wherein the computer program product is operable such that a second application control is presented in connection with the first navigation control.

248. The computer program product of claim 247 wherein the computer program product is operable such that the second application control is presented based on a state of the second application.

249. The computer program product of claim 247 wherein the computer program product is operable such that the second application control is presented based on a state of the second visual component.

250. The computer program product of claim 247 wherein the computer program product is operable such that the second application control is presented with a plurality of application controls based on a specified order of the applications.

251. The computer program product of claim 250 wherein the computer program product is operable such that the specified order is based on a state of a process context for one or more of the applications.

252. The computer program product of claim 250 wherein the computer program product is operable such that the specified order is based on a state of a thread context in a process context associated with one or more of the applications.

253. The computer program product of claim 250 wherein the computer program product is operable such that the specified order is based on a user action.

254. The computer program product of claim 236 wherein the computer program product is operable such that a second visual component control is presented in connection with the first navigation control.

255. The computer program product of claim 254 wherein the computer program product is operable such that the second visual component control is presented based on a state of the second application.

256. The computer program product of claim 254 wherein the computer program product is operable such that the second visual component control is presented based on a state of the second visual component.

257. The computer program product of claim 254 wherein the computer program product is operable such that the second visual component control is presented with a plurality of visual component controls based on a specified order of the applications.

258. The computer program product of claim 257 wherein the computer program product is operable such that the specified order is based on a state of a process context for an application.

259. The computer program product of claim 257 wherein the computer program product is operable such that the specified order is based on a state of a thread context in a process context.

260. The computer program product of claim 257 wherein the computer program product is operable such that the specified order is based on a user-assigned order.

261. The computer program product of claim 236 wherein the computer program product is operable such that the first navigation control is presented in response to an interaction with a hot key.

262. The computer program product of claim 236 wherein the computer program product is operable such that the first navigation region is determined based on the location of the first visual component.

263. The computer program product of claim 236 wherein the computer program product is operable such that the first navigation region is determined based on the location of the parent visual component of the first visual component.

264. The computer program product of claim 236 wherein the computer program product is operable such that the first navigation region is determined based on the location of the child visual component of the first visual component.

265. The computer program product of claim 236 wherein the computer program product is operable such that the first navigation control is automatically presented in response to a presenting of the first visual component.

266. The computer program product of claim 236 wherein the computer program product is operable such that the first navigation control is presented in response to a change detected in a visually detectable attribute of the first visual component.

267. The computer program product of claim 236 wherein the computer program product is operable such that the plurality of operating applications are operating in a manner to allow context switching, via the first navigation control, among a plurality of specific contexts associated with the operating applications.

268. The computer program product of claim 236 wherein the computer program product is operable such that the first navigation region moves with the first application region.

269. The computer program product of claim 236 wherein the computer program product is operable such that the first navigation region moves in response to a user moving the first application region.

270. The computer program product of claim 236 wherein the computer program product is operable such that the first navigation region moves as a function of a movement of the first application region.

271. The computer program product of claim 236 wherein the computer program product is operable such that the first navigation control is presented, in response to a user action, via an interface that is outside the first application region, for allowing switching among a plurality of updated visual components of the plurality of operating applications.

272. The computer program product of claim 236 wherein the computer program product is operable such that the first navigation control is presented, in response to a user action, via an interface that includes a plurality application indicia and a plurality of visual component representations situated side-by-side, at least in part, and is outside the first application region, for allowing switching among a plurality of updated visual components of the plurality of operating applications.

273. The computer program product of claim 236 wherein the computer program product is operable such that the first navigation control is at least partially transparent.

\* \* \* \* \*